United States Patent
Vaught et al.

(10) Patent No.: US 9,395,811 B2
(45) Date of Patent: *Jul. 19, 2016

(54) AUTOMATIC TEXT SCROLLING ON A DISPLAY DEVICE

(71) Applicant: Microsoft Technology Licensing, LLC, Redmond, WA (US)

(72) Inventors: Benjamin I Vaught, Seattle, WA (US); Alex Aben-Athar Kipman, Redmond, WA (US); Robert Crocco, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 148 days.

This patent is subject to a terminal disclaimer.

(21) Appl. No.: 14/285,938

(22) Filed: May 23, 2014

(65) Prior Publication Data

US 2014/0253437 A1    Sep. 11, 2014

Related U.S. Application Data

(63) Continuation of application No. 13/193,563, filed on Jul. 28, 2011, now Pat. No. 8,767,014.

(30) Foreign Application Priority Data

Jul. 22, 2011    (AU) ................. 2011204946

(51) Int. Cl.
*G06F 3/01*        (2006.01)
*G02B 27/01*    (2006.01)

(52) U.S. Cl.
CPC .............. *G06F 3/011* (2013.01); *G02B 27/017* (2013.01); *G06F 3/013* (2013.01); *G02B 2027/0178* (2013.01); *G02B 2027/0187* (2013.01); *G09G 2320/0261* (2013.01); *G09G 2380/02* (2013.01)

(58) Field of Classification Search
None
See application file for complete search history.

(56) References Cited

U.S. PATENT DOCUMENTS 5,850,211 A    12/1998  Tognazzini
6,067,069 A     5/2000  Krause
(Continued)

FOREIGN PATENT DOCUMENTS

WO    WO 2005/124429 A1    12/2005

OTHER PUBLICATIONS

Ajanki, Antti, et al., "An Augmented Reality Interface to Contextual Information," Retrieved from the internet on May 3, 2011, [http://webcache.googleusercontent.com/search?q=cachesQr1VqO-jucJ:research.ics.tkk.fi/mi . . . ], pp. 1-21.
Office Action dated Oct. 21, 2011, Australian Patent Application No. 2011204946.
Response to Office Action dated Nov. 29, 2011, Australian Patent Application No. 2011204946.
(Continued)

*Primary Examiner* — Maurice L McDowell, Jr.
(74) *Attorney, Agent, or Firm* — Dan Choi; Judy Yee; Micky Minhas

(57) ABSTRACT

A see-through head-mounted display (HMD) device, e.g., in the form of glasses, provides view an augmented reality image including text, such as in an electronic book or magazine, word processing document, email, karaoke, teleprompter or other public speaking assistance application. The presentation of text and/or graphics can be adjusted based on sensor inputs indicating a gaze direction, focal distance and/or biological metric of the user. A current state of the text can be bookmarked when the user looks away from the image and subsequently resumed from the bookmarked state. A forward facing camera can adjust the text if a real word object passes in front of it, or adjust the appearance of the text based on a color of pattern of a real world background object. In a public speaking or karaoke application, information can be displayed regarding a level of interest of the audience and names of audience members.

20 Claims, 27 Drawing Sheets

(56) References Cited

U.S. PATENT DOCUMENTS

| | | | |
|---|---|---|---|
| 6,127,990 A | 10/2000 | Zwern | |
| 6,191,892 B1 | 2/2001 | Isaka et al. | |
| 6,421,064 B1 | 7/2002 | Lemelson et al. | |
| 6,847,336 B1 | 1/2005 | Lemelson et al. | |
| 6,943,754 B2 | 9/2005 | Aughey et al. | |
| 2002/0008625 A1* | 1/2002 | Adams | G08B 21/0211 340/573.1 |
| 2002/0105482 A1 | 8/2002 | Lemelson et al. | |
| 2004/0052404 A1* | 3/2004 | Houvener | G07C 9/00087 382/115 |
| 2006/0066567 A1 | 3/2006 | Scharenbroch et al. | |
| 2007/0276270 A1 | 11/2007 | Tran | |
| 2008/0129955 A1* | 6/2008 | Lewis | G09G 3/00 351/159.05 |
| 2010/0205541 A1 | 8/2010 | Rapaport et al. | |
| 2011/0077548 A1* | 3/2011 | Torch | A61B 3/112 600/558 |
| 2011/0169776 A1 | 7/2011 | Ouchi | |
| 2012/0078628 A1* | 3/2012 | Ghulman | G06F 3/14 704/235 |
| 2013/0021373 A1 | 1/2013 | Vaught et al. | |

OTHER PUBLICATIONS

Restriction Requirement dated Jun. 28, 2012, U.S. Appl. No. 13/193,563, filed Jul. 28, 2011.
Response to Restriction Requirement dated Jul. 16, 2012, U.S. Appl. No. 13/193,563, filed Jul. 28, 2011.
Non-final Office Action dated Sep. 14, 2012, U.S. Appl. No. 13/193,563, filed Jul. 28, 2011.
Response to Office Action dated Oct. 24, 2012, U.S. Appl. No. 13/193,563, filed Jul. 28, 2011.
Final Office Action dated Dec. 12, 2012, U.S. Appl. No. 13/193,563, filed Jul. 28, 2011.
Response to Office Action dated Feb. 26, 2013, U.S. Appl. No. 13/193,563, filed Jul. 28, 2011.
Office Action dated Apr. 15, 2013, Australian Patent Application No. 2013200187.
Response to Office Action dated May 22, 2013, Australian Patent Application No. 2013200187.
Supplemental Amendment dated Aug. 16, 2013, U.S. Appl. No. 13/193,563, filed Jul. 28, 2011.
Notice of Allowance dated Feb. 13, 2014, U.S. Appl. No. 13/193,563, filed Jul. 28, 2011.

* cited by examiner

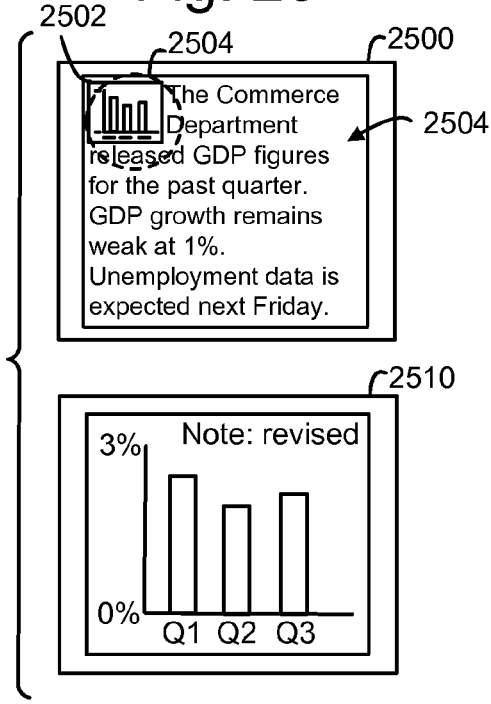
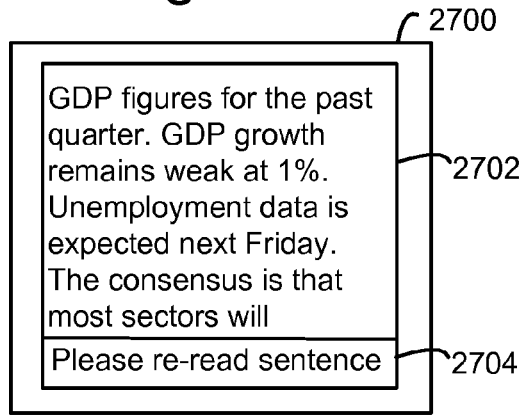
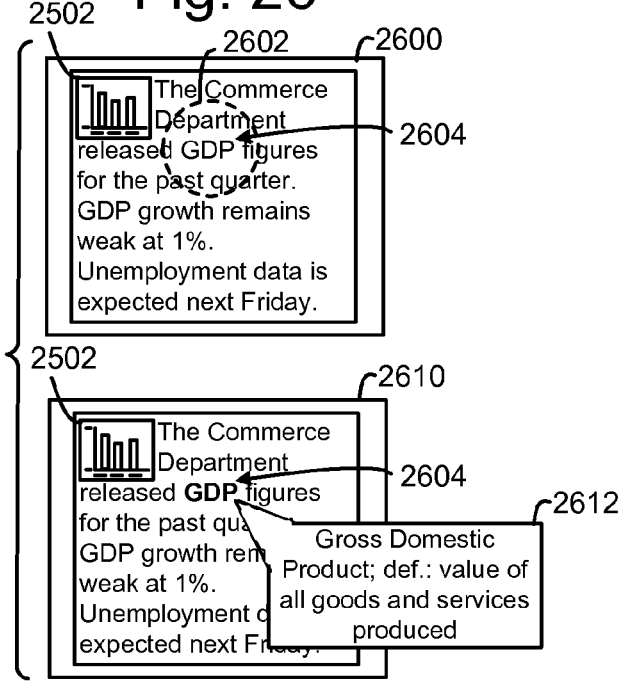

AUTOMATIC TEXT SCROLLING ON A DISPLAY DEVICE

PRIORITY CLAIM

This application is a continuation of U.S. patent application Ser. No. 13/193,563, filed Jul. 28, 2011, published as U.S. 2013/0021373 on Jan. 24, 2013 and issued as U.S. Pat. No. 8,767,014 on Jul. 1, 2014, which claims priority to Australian (AU) patent application 2011204946, filed Jul. 22, 2011, both of which are incorporated herein by reference.

BACKGROUND

Head-mounted display (HMD) devices can be used in various applications, including military, aviation, medicine, video gaming, entertainment, sports, and so forth. See-through HMD devices allow the user to observe the physical world, while optical elements add light from one or more small micro-displays into the user's visual path, to provide an augmented reality image. The augmented reality image may include text, for instance.

SUMMARY

A head mounted display (HMD) device is provided. The HMD may include associated electrical and optical components which provide a per-user, personalized point-of-view of augmented reality images. In one approach, the augmented reality images include text.

In one embodiment, a HMD device is provided which includes a see-through lens, a microdisplay, a sensor and a control circuit. The microdisplay projects augmented reality images, including text, through the see-through lens, to an eye of a user. The sensor tracks a gaze direction, focal distance and/or biological metric of the user. The control circuit controls the microdisplay, responsive to the sensor, to advance or otherwise control a display of the text. For example, in an electronic book or magazine, word processing document, email, karaoke, teleprompter or other public speaking assistance application, the user may read a page of text and then advance to a next page of text, in a page-by-page manner. Or, the text may advance vertically and/or horizontally, in 2D or 3D, in a scrolling manner. The user can read the text silently. Or, the user can vocalize the text such as by speaking or singing, typically with an audience present. Audience feedback can be gathered and indicated in the augmented reality image.

Various features can be provided based on, e.g., an analysis of what the user is gazing, a gaze pattern of the user, an orientation of the user's head, a forward-facing camera, a focal distance of the user, a biological metric of the user, a level of interest of another person, and an identifier of another person.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

In the drawings, like-numbered elements correspond to one another.

FIG. 25 depicts an example of an enlarged graphic element in accordance with step 1404 of FIG. 14.

FIG. 26 depicts an example of a display of auxiliary information in accordance with step 1406 of FIG. 14.

FIG. 27A depicts an example message based on whether a gaze pattern is consistent with a template in accordance with step 1410 of FIG. 14.

DETAILED DESCRIPTION

Figure 1:
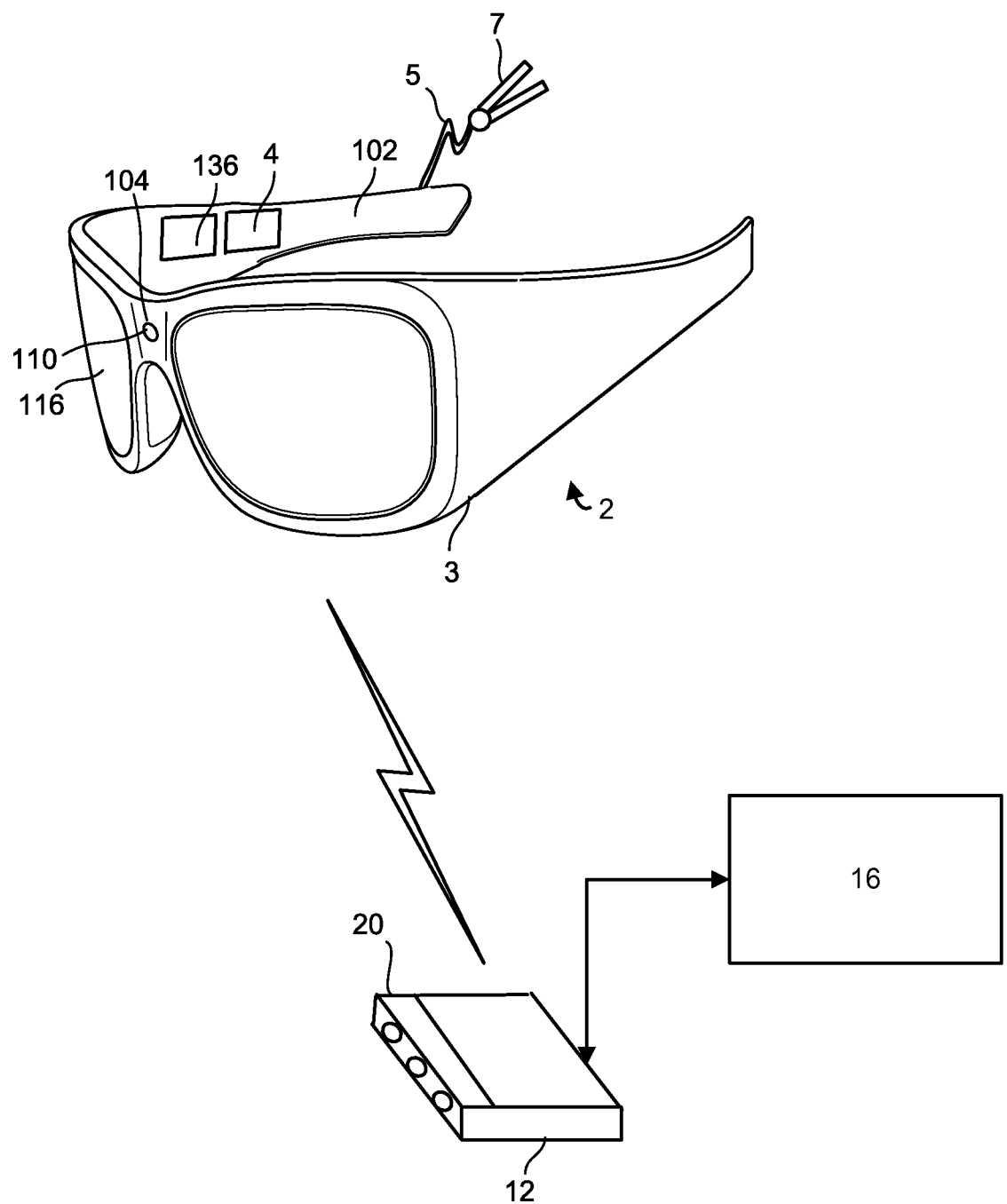
FIG. 1 is a block diagram depicting example components of one embodiment of an HMD device in communication with a hub computing system 12.

See-through HMD devices can use optical elements such as mirrors, prisms, and holographic lenses to add light from one or two small micro-displays into a user's visual path. The light provides augmented reality images, which can include text, to the user's eyes via see-though lenses. However, there is a need to manage the presentation and advancement of the text. One approach is to allow the user to manually scroll through the text using some type of control input mechanism. However, this can be unnatural and cumbersome, particularly in the HMD environment. In various applications such as an electronic book or magazine, karaoke, teleprompter or other public speaking assistance application, it is helpful for the text to be advanced in a manner which is easy and natural for the user. A robust system for automatically advancing text can take advantage of the capabilities of an HMD device, such as the capability to recognize the surrounding environment, and to determine a gaze direction and focal distance of the user's eyes. Other capabilities such as audio detection and geo-location detection can also be used. The system should avoid bulky hardware and be suitable for integration on a HMD device.

An HMD device provided herein presents and scrolls through bodies of text in a simple, natural way for the user, enabling the user to lead, follow along, or be guided in both text consumption and speech. For data collection, the system can use a combination of inputs including: eye tracking, geographical data, inertial measurement unit (IMU) data, 3D environment modeling, audio, biometric data, network-level and system-level information. Inputs from other people such as via their mobile terminals can also be used. For data presentation, the system can use a combination of HMD system-specific outputs, including: dynamic focus, blending in to the environment, and integration with network-level data and context.

In one aspect, text auto-scrolling is provided which uses multiple inputs. While an auto text scroller uses only basic eye tracking, it is also possible to use additional inputs as described herein to present and scroll through text in a way that is natural, customized/unique to the user, and sensitive to the state of the user and the environment.

In another aspect, a distinction is made between eye position and text comprehension. By combining additional inputs, as well as a unique, robust eye tracking solution, the HMD device can distinguish between a user merely staring blankly at a word or words, and actually understanding them.

In another aspect, karaoke/public speaking assistance is provided. Audio inputs can be used to allow the HMD device to help the user sing a song on time, read a speech with proper tempo and volume, and make on-the-fly adjustments based on contextual data. With one example of contextual data, the HMD device receives and displays an identifier of a person in the audience, e.g., to allow a karaoke performer to call out the person's name while singing. For example, the singer can acknowledge the presence of one or more friends while singing, such as by dedicating a song to the one or more friends. Or, the singer can replace the name of a person in the song a with a friend's name. Another example of contextual data is the HMD device receiving biological data from the speaker and/or from a person in the audience, e.g., to display a message regarding an optimal tempo and volume/enunciation. These and other features can be provided by an HMD device.

FIG. 1 is a block diagram depicting example components of one embodiment of a HMD device. The HMD device 2 includes a head-mounted frame 3 which can be generally in the shape of an eyeglass frame, and include a temple 102, and a front lens frame including a nose bridge 104. Built into nose bridge 104 is a microphone 110 for recording sounds and transmitting that audio data to processing unit 4. Lens 116 is a see-through lens.

The HMD device can be worn on the head of a user so that the user can see through a display and thereby see a real-world scene which includes an image which is not generated by the HMD device. The HMD device 2 can be self-contained so that all of its components are carried by, e.g., physically supported by, the frame 3. Optionally, one or more component of the HMD device are not carried by the frame. For example, one of more components which are not carried by the frame can be physically attached by a wire to a component carried by the frame. The clip-shaped sensor 7 attached by a wire 5, is one such example. The sensor 7 is a biological sensor such as a heart rate sensor which can be clipped to the user's ear. One example of a heart rate sensor emits infrared light at one side of the ear and senses, from the other side, the intensity of the light which is transmitted through the vascular tissue in the ear. There will be variations in the intensity due to variations in blood volume which correspond to the heart rate. Another example of a heart rate sensor attaches to the fingertip. Another example of a heart rate sensor uses a chest strap to detect EKG signals which can be transmitted wirelessly or by wire to receiving and processing circuitry of the HMD device. In addition to a level of the heart rate, e.g., the pulse rate, the regularity of the heart rate can be determined. A heart rate can be classified as regular or jittery, for instance.

Heart rate could also be detected from images of the eye which are obtained from eye tracking camera 134B, described below. For example, US2006/0149154, "Method and apparatus for measuring tissue perfusion," incorporated herein by reference, measures microcirculatory flow of a target tissue such as the surface of the retina without the need to contact the tissue. A pulsed source of light irradiates the tissue, and a matched sensor transduces variations in the reflected light to an electric signal which is indicative of a heart rate and a tissue perfusion index. Another example of a heart rate sensor uses a sensor at the nose bridge, such as discussed in U.S. Pat. No. 6,431,705, "Eyewear heart rate monitor," incorporated herein by reference.

Further, one of more components which are not carried by the frame can be in wireless communication with a component carried by the frame, and not physically attached by a wire or otherwise to a component carried by the frame. The one or more components which are not carried by the frame can be carried by the user, in one approach, such as on the wrist. The processing unit 4 could be connected to a component in the frame via a wire or via a wireless link. The term "HMD device" can encompass both on-frame and off-frame components.

The processing unit 4 includes much of the computing power used to operate HMD device 2. The processor may execute instructions stored on a processor readable storage device for performing the processes described herein. In one embodiment, the processing unit 4 communicates wirelessly (e.g., using Wi-Fi®, BLUETOOTH®, infrared (e.g., IrDA® or INFRARED DATA ASSOCIATION® standard), or other wireless communication means) to one or more hub computing systems 12.

Control circuits 136 provide various electronics that support the other components of HMD device 2.

Hub computing system 12 may be a computer, a gaming system or console, or the like. According to an example embodiment, the hub computing system 12 may include hardware components and/or software components to execute applications such as gaming applications, non-gaming applications, or the like. The hub computing system 12 may include a processor that may execute instructions stored on a processor readable storage device for performing the processes described herein.

Hub computing system 12 further includes one or more capture devices, such as a capture device 20. The capture device 20 may be, for example, a camera that visually monitors one or more users and the surrounding space such that gestures and/or movements performed by the one or more users, as well as the structure of the surrounding space, may be captured, analyzed, and tracked to perform one or more controls or actions.

Hub computing system 12 may be connected to an audiovisual device 16 such as a television, a monitor, a high-definition television (HDTV), or the like that may provide game or application visuals. For example, hub computing system 12 may include a video adapter such as a graphics card and/or an audio adapter such as a sound card that may provide audiovisual signals associated with the game application, non-game application, etc. The audiovisual device 16 may receive the audiovisual signals from hub computing system 12 and may then output the game or application visuals and/or audio associated with the audiovisual signals.

Hub computing device 10, with capture device 20, may be used to recognize, analyze, and/or track human (and other types of) targets. For example, a user wearing the HMD device 2 may be tracked using the capture device 20 such that the gestures and/or movements of the user may be captured to animate an avatar or on-screen character and/or may be interpreted as controls that may be used to affect the application being executed by hub computing system 12.

Figure 2:
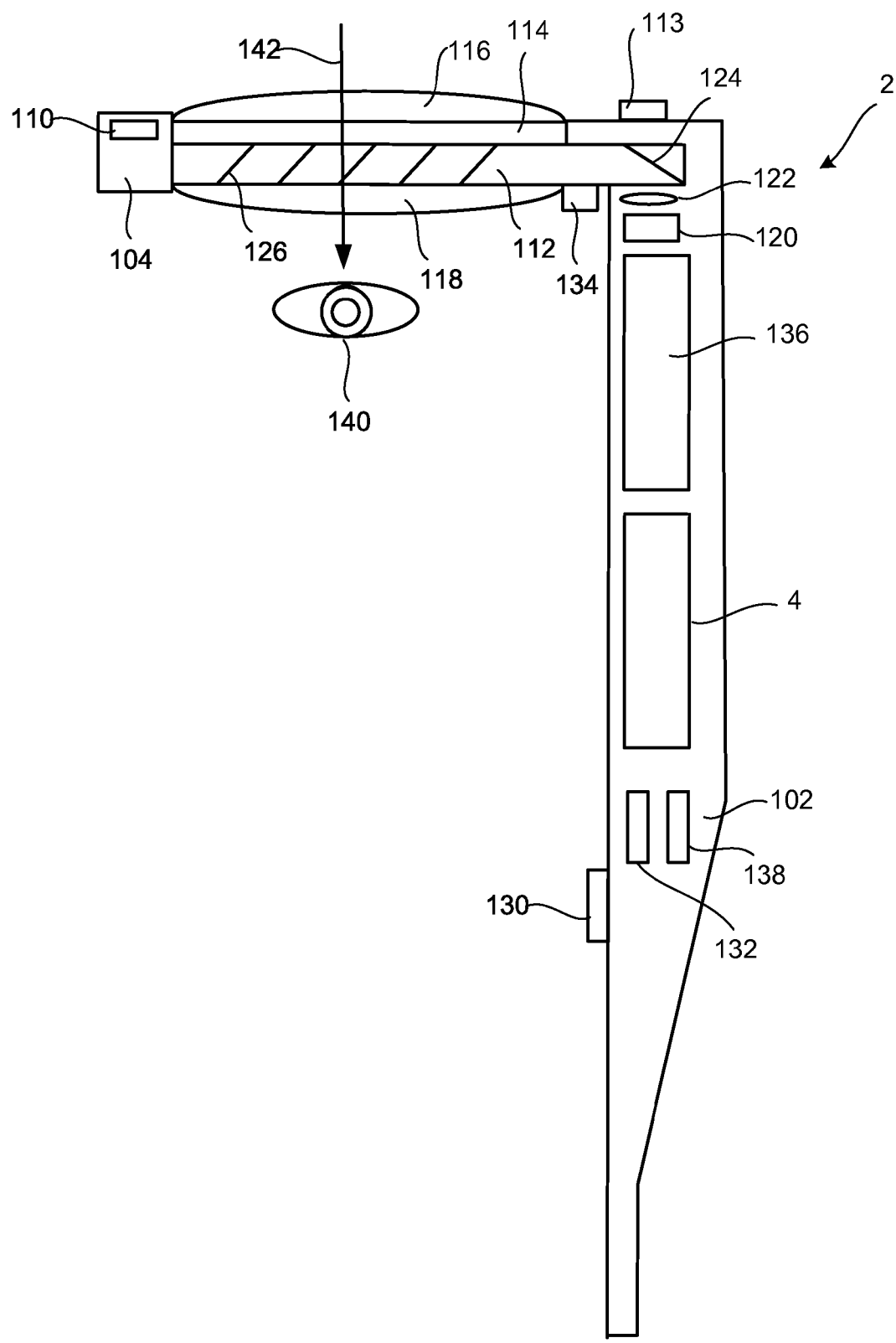
FIG. 2 is a top view of a portion of one embodiment of a HMD device.

FIG. 2 depicts a top view of a portion of HMD device 2, including a portion of the frame that includes temple 102 and nose bridge 104. Only the right side of HMD device 2 is depicted. At the front of HMD device 2 is a forward- or room-facing video camera 113 that can capture video and still images. Those images are transmitted to processing unit 4, as described below. The forward-facing video camera 113 faces outward and has a viewpoint similar to that of the user.

A portion of the frame of HMD device 2 surrounds a display that includes one or more lenses. To show the components of HMD device 2, a portion of the frame surrounding the display is not depicted. The display includes a light guide optical element 112, opacity filter 114, see-through lens 116 and see-through lens 118. In one embodiment, opacity filter 114 is behind and aligned with see-through lens 116, light guide optical element 112 is behind and aligned with opacity filter 114, and see-through lens 118 is behind and aligned with light guide optical element 112. See-through lenses 116 and 118 are standard lenses used in eye glasses and can be made to any prescription (including no prescription). In one embodiment, see-through lenses 116 and 118 can be replaced by a variable prescription lens. In some embodiments, HMD device 2 will include only one see-through lens or no see-through lenses. In another alternative, a prescription lens can go inside light guide optical element 112. Opacity filter 114 filters out natural light (either on a per pixel basis or uniformly) to enhance the contrast of the augmented reality imagery. Light guide optical element 112 channels artificial light to the eye.

Mounted to or inside temple 102 is an image source, which (in one embodiment) includes microdisplay 120 for projecting an augmented reality image and lens 122 for directing images from microdisplay 120 into light guide optical element 112. In one embodiment, lens 122 is a collimating lens. An augmented reality emitter can include microdisplay 120, one or more optical components such as the lens 122 and light guide 112, and associated electronics such as a driver. Such an augmented reality emitter is associated with the HMD device, and emits light to a user's eye, where the light represents augmented reality still or video images.

Control circuits 136 provide various electronics that support the other components of HMD device 2. More details of control circuits 136 are provided below with respect to FIG. 3. Inside, or mounted to temple 102, are ear phones 130, inertial sensors 132 and biological metric sensor 138. For example, the biological sensor can represent the heart rate sensor components 5 and 7 of FIG. 1. Other biological sensors could be provided to detect a biological metric such as body temperature, blood pressure or blood glucose level. Characteristics of the user's voice such as pitch or rate of speech can also be considered to be biological metrics. The eye tracking camera 134B can also detect a biological metric such as pupil dilation amount in one or both eyes. Heart rate could also be detected from images of the eye which are obtained from eye tracking camera 134B. In one embodiment, inertial sensors 132 include a three axis magnetometer 132A, three axis gyro 132B and three axis accelerometer 132C (See FIG. 3). The inertial sensors are for sensing position, orientation, sudden accelerations of HMD device 2. For example, the inertial sensors can be one or more sensors which are used to determine an orientation and/or location of user's head.

Microdisplay 120 projects an image through lens 122. Different image generation technologies can be used. For example, with a transmissive projection technology, the light source is modulated by optically active material, and backlit with white light. These technologies are usually implemented using LCD type displays with powerful backlights and high optical energy densities. With a reflective technology, external light is reflected and modulated by an optically active material. The illumination is forward lit by either a white source or RGB source, depending on the technology. Digital light processing (DGP), liquid crystal on silicon (LCOS) and MIRASOL® (a display technology from QUALCOMM®, INC.) are all examples of reflective technologies which are efficient as most energy is reflected away from the modulated structure. With an emissive technology, light is generated by the display. For example, a PicoP™-display engine (available from MICROVISION, INC.) emits a laser signal with a micro mirror steering either onto a tiny screen that acts as a transmissive element or beamed directly into the eye.

Light guide optical element 112 transmits light from microdisplay 120 to the eye 140 of the user wearing the HMD device 2. Light guide optical element 112 also allows light from in front of the HMD device 2 to be transmitted through light guide optical element 112 to eye 140, as depicted by arrow 142, thereby allowing the user to have an actual direct view of the space in front of HMD device 2, in addition to receiving an augmented reality image from microdisplay 120. Thus, the walls of light guide optical element 112 are see-through. Light guide optical element 112 includes a first reflecting surface 124 (e.g., a mirror or other surface). Light from microdisplay 120 passes through lens 122 and is incident on reflecting surface 124. The reflecting surface 124 reflects the incident light from the microdisplay 120 such that light is trapped inside a planar, substrate comprising light guide optical element 112 by internal reflection. After several reflections off the surfaces of the substrate, the trapped light waves reach an array of selectively reflecting surfaces, including example surface 126.

Reflecting surfaces 126 couple the light waves incident upon those reflecting surfaces out of the substrate into the eye 140 of the user. As different light rays will travel and bounce off the inside of the substrate at different angles, the different rays will hit the various reflecting surface 126 at different angles. Therefore, different light rays will be reflected out of the substrate by different ones of the reflecting surfaces. The selection of which light rays will be reflected out of the substrate by which surface 126 is engineered by selecting an appropriate angle of the surfaces 126. More details of a light guide optical element can be found in U.S. Patent Application Publication 2008/0285140, published on Nov. 20, 2008, incorporated herein by reference in its entirety. In one embodiment, each eye will have its own light guide optical element 112. When the HMD device has two light guide optical elements, each eye can have its own microdisplay 120 that can display the same image in both eyes or different images in the two eyes. In another embodiment, there can be one light guide optical element which reflects light into both eyes.

Opacity filter 114, which is aligned with light guide optical element 112, selectively blocks natural light, either uniformly or on a per-pixel basis, from passing through light guide optical element 112. In one embodiment, the opacity filter can be a see-through LCD panel, electrochromic film, or similar device. A see-through LCD panel can be obtained by removing various layers of substrate, backlight and diffusers from a conventional LCD. The LCD panel can include one or more light-transmissive LCD chips which allow light to pass through the liquid crystal. Such chips are used in LCD projectors, for instance.

Opacity filter 114 can include a dense grid of pixels, where the light transmissivity of each pixel is individually controllable between minimum and maximum transmissivities. A transmissivity can be set for each pixel by the opacity filter control circuit 224, described below. More details of an opacity filter are provided in U.S. patent application Ser. No. 12/887,426, "Opacity Filter For See-Through Mounted Display," filed on Sep. 21, 2010, incorporated herein by reference in its entirety.

In one embodiment, the display and the opacity filter are rendered simultaneously and are calibrated to a user's precise position in space to compensate for angle-offset issues. Eye tracking (e.g., using eye tracking camera 134) can be employed to compute the correct image offset at the extremities of the viewing field.

Figure 3:
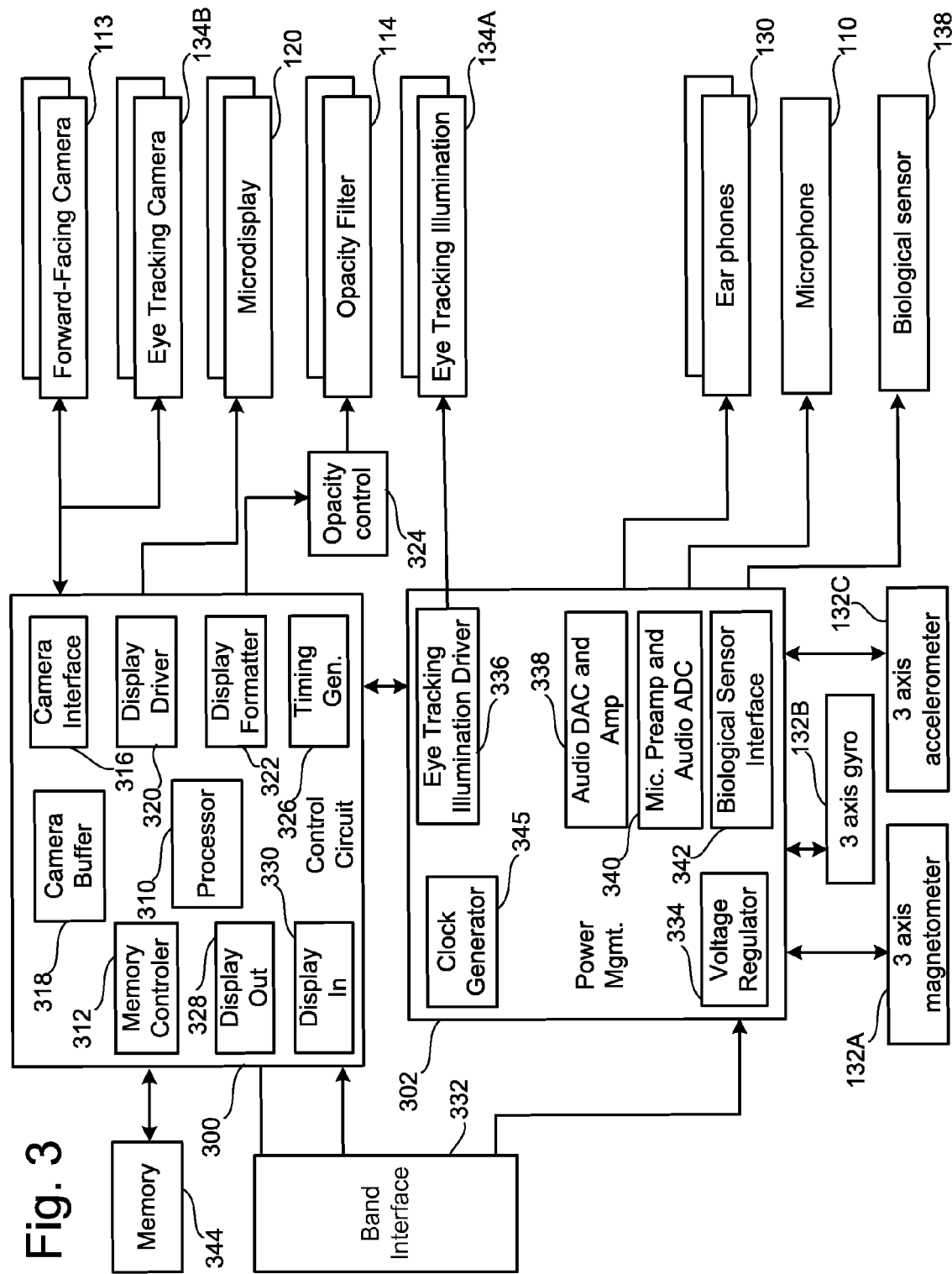
FIG. 3 is a block diagram of one embodiment of the components of a HMD device.
Figure 4:
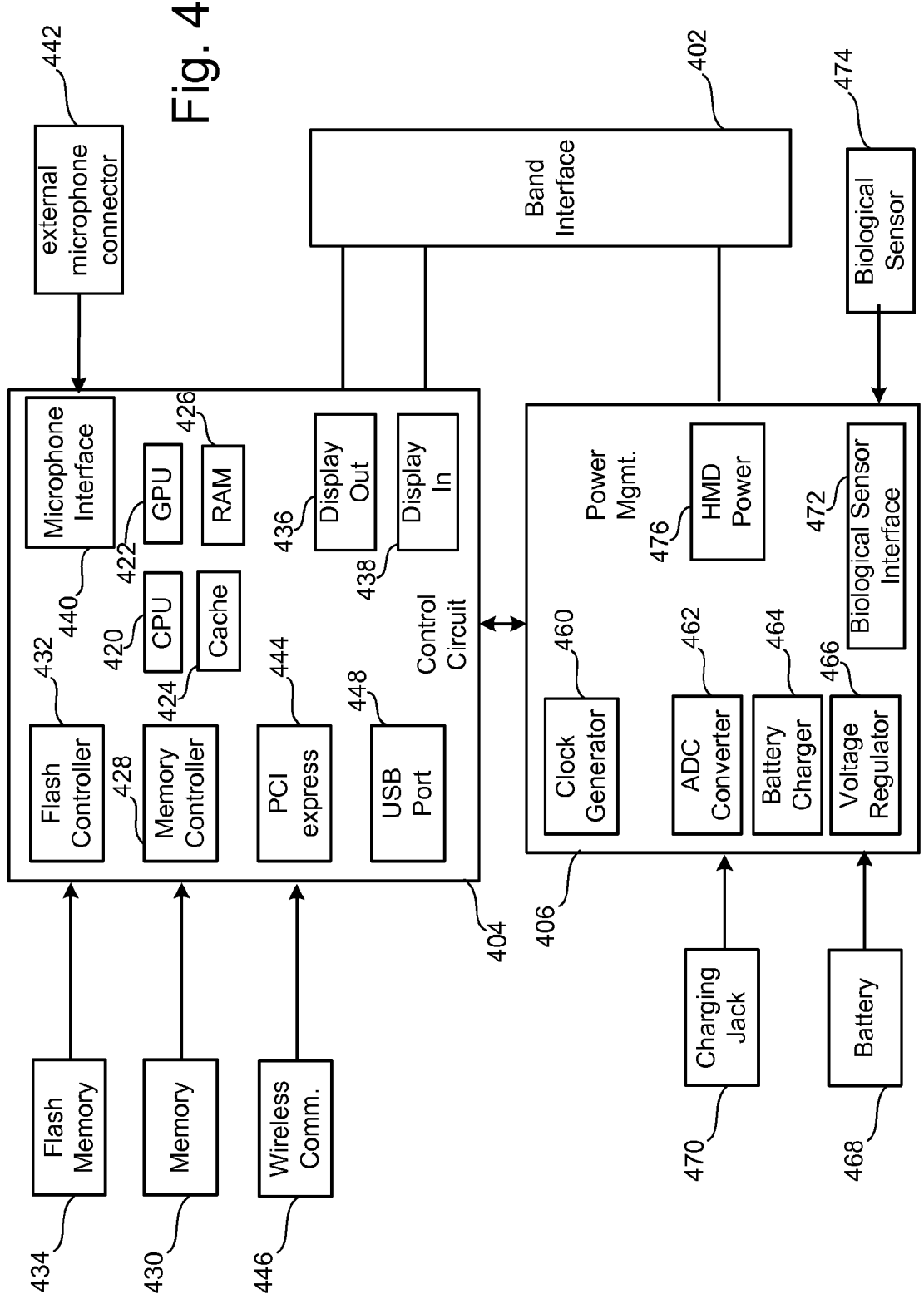
FIG. 4 is a block diagram of one embodiment of the components of a processing unit of a HMD device.

FIG. 3 is a block diagram depicting the various components of HMD device 2. FIG. 4 is a block diagram describing the various components of processing unit 4. The HMD device components include many sensors that track various conditions. The HMD device will receive instructions about the augmented reality image from processing unit 4 and will provide the sensor information back to processing unit 4. Processing unit 4, the components of which are depicted in FIG. 4, will receive the sensory information of the HMD device 2. Optionally, the processing unit 4 also receives sensory information from hub computing device 12 (See FIG. 1). Based on that information, processing unit 4 will determine where and when to provide an augmented reality image to the user and send instructions accordingly to the HMD device of FIG. 3.

Note that some of the components of FIG. 3 (e.g., forward facing camera 113, eye tracking camera 134B, microdisplay 120, opacity filter 114, eye tracking illumination 134A and earphones 130) are shown in shadow to indicate that there are two of each of those devices, one for the left side and one for the right side of HMD device. Regarding the forward-facing camera 113, in one approach, one camera is used to obtain images using visible light.

In another approach, two or more cameras with a known spacing between them are used as a depth camera to also obtain depth data for objects in a room, indicating the distance from the cameras/HMD device to the object. The cameras of the HMD device can essentially duplicate the functionality of the depth camera provided by the computer hub 12 (see also capture device 20 of FIG. 5).

Images from forward facing cameras can be used to identify people and other objects in a field of view of the user. For example, it can be determined when a real world object passes in front of a virtual object/augmented reality image. The boundaries of the real world object can be determined and the augmented reality image, such as a display of text, modified, so that the user sees the real world object in place of a portion of the text which is behind the real world object. This avoids an unrealistic result such as the user seeing the text displayed on a real world object such as the user's hand which passes in front of the text. See FIGS. 21A and 21B.

FIG. 3 shows the control circuit 300 in communication with the power management circuit 302. Control circuit 300 includes processor 310, memory controller 312 in communication with memory 344 (e.g., DRAM), camera interface 316, camera buffer 318, display driver 320, display formatter 322, timing generator 326, display out interface 328, and display in interface 330. In one embodiment, all of components of control circuit 300 are in communication with each other via dedicated lines or one or more buses. In another embodiment, each of the components of control circuit 300 is in communication with processor 310. Camera interface 316 provides an interface to the two forward facing cameras 113 and stores images received from the forward facing cameras in camera buffer 318. Display driver 320 drives microdisplay 120. Display formatter 322 provides information, about the augmented reality image being displayed on microdisplay 120, to opacity control circuit 324, which controls opacity filter 114. Timing generator 326 is used to provide timing data for the system. Display out interface 328 is a buffer for providing images from forward facing cameras 112 to the processing unit 4. Display in interface 330 is a buffer for receiving images such as an augmented reality image to be displayed on microdisplay 120.

Display out interface 328 and display in interface 330 communicate with band interface 332 which is an interface to processing unit 4, when the processing unit is attached to the frame of the HMD device by a wire, or communicates by a wireless link, and is worn on the wrist of the user on a wrist band. This approach reduces the weight of the frame-carried components of the HMD device. In other approaches, as mentioned, the processing unit can be carried by the frame and a band interface is not used.

Power management circuit 302 includes voltage regulator 334, eye tracking illumination driver 336, audio DAC and amplifier 338, microphone preamplifier audio ADC 340, biological sensor interface 342 and clock generator 345. Voltage regulator 334 receives power from processing unit 4 via band interface 332 and provides that power to the other components of HMD device 2. Eye tracking illumination driver 336 provides the infrared (IR) light source for eye tracking illumination 134A, as described above. Audio DAC and amplifier 338 receives the audio information from earphones 130. Microphone preamplifier and audio ADC 340 provides an interface for microphone 110. Biological sensor interface 342 is an interface for biological sensor 138. Power management unit 302 also provides power and receives data back from three-axis magnetometer 132A, three-axis gyroscope 132B and three axis accelerometer 132C.

FIG. 4 is a block diagram describing the various components of processing unit 4. Control circuit 404 is in communication with power management circuit 406. Control circuit 404 includes a central processing unit (CPU) 420, graphics processing unit (GPU) 422, cache 424, RAM 426, memory control 428 in communication with memory 430 (e.g., DRAM), flash memory controller 432 in communication with flash memory 434 (or other type of non-volatile storage), display out buffer 436 in communication with HMD device 2 via band interface 402 and band interface 332 (when used), display in buffer 438 in communication with HMD device 2 via band interface 402 and band interface 332 (when used), microphone interface 440 in communication with an external microphone connector 442 for connecting to a microphone, Peripheral Component Interconnect (PCI) express interface 444 for connecting to a wireless communication device 446, and USB port(s) 448.

In one embodiment, wireless communication component 446 can include a Wi-Fi® enabled communication device, BLUETOOTH® communication device, infrared communication device, etc. The wireless communication component 446 is a wireless communication interface which, in one implementation, receives data in synchronism with the content displayed by the audiovisual device 16. Further, augmented reality images may be displayed in response to the received data. In one approach, such data is received from the hub computing system 12.

The USB port can be used to dock the processing unit 4 to hub computing device 12 to load data or software onto processing unit 4, as well as charge processing unit 4. In one embodiment, CPU 420 and GPU 422 are the main workhorses for determining where, when and how to insert augmented reality images into the view of the user. More details are provided below.

Power management circuit 406 includes clock generator 460, analog to digital converter 462, battery charger 464, voltage regulator 466, HMD power source 476, and biological sensor interface 472 in communication with biological sensor 474. Analog to digital converter 462 is connected to a charging jack 470 for receiving an AC supply and creating a DC supply for the system. Voltage regulator 466 is in communication with battery 468 for supplying power to the system. Battery charger 464 is used to charge battery 468 (via voltage regulator 466) upon receiving power from charging jack 470. HMD power source 476 provides power to the HMD device 2.

The calculations that determine where, how and when to insert an augmented reality image and performed by the HMD device 2 and/or the hub computing device 12.

In one example embodiment, hub computing device 12 will create a model of the environment that the user is in and track various moving objects in that environment. In addition, hub computing device 12 tracks the field of view of the HMD device 2 by tracking the position and orientation of HMD device 2. The model and the tracking information are provided from hub computing device 12 to processing unit 4. Sensor information obtained by HMD device 2 is transmitted to processing unit 4. Processing unit 4 then uses additional sensor information it receives from HMD device 2 to refine the field of view of the user and provide instructions to HMD device 2 on how, where and when to insert the augmented reality image.

Figure 5:
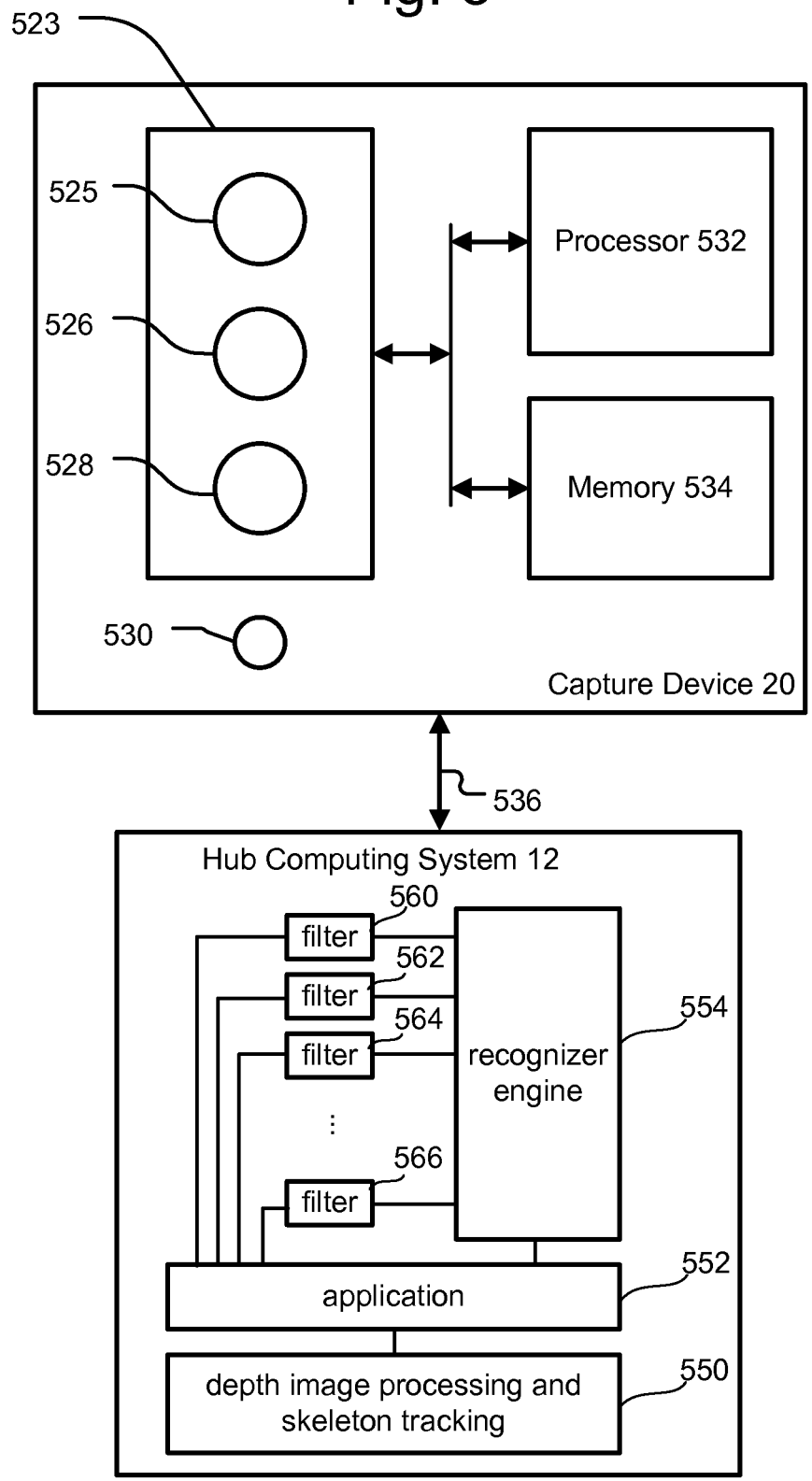
FIG. 5 is a block diagram of one embodiment of the components of the hub computing system 12 and the capture device 20 of FIG. 1.

FIG. 5 illustrates an example embodiment of the hub computing system 12 and the capture device 20 of FIG. 1. According to an example embodiment, capture device 20 may be configured to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight.

Capture device 20 may include a camera component 523, which may be or may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

Camera component 523 may include an infrared (IR) light component 525, an infrared camera 526, and an RGB (visual image) camera 528 that may be used to capture the depth image of a scene. A 3-D camera is formed by the combination of the infrared emitter 24 and the infrared camera 26. For example, in time-of-flight analysis, the IR light component 525 of the capture device 20 may emit an infrared light onto the scene and may then use sensors (in some embodiments, including sensors not shown) to detect the backscattered light from the surface of one or more targets and objects in the scene using, for example, the 3-D camera 526 and/or the RGB camera 528. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, the phase of the outgoing light wave may be compared to the phase of the incoming light wave to determine a phase shift. The phase shift may then be used to determine a physical distance from the capture device to a particular location on the targets or objects.

A time-of-flight analysis may be used to indirectly determine a physical distance from the capture device 20 to a particular location on the targets or objects by analyzing the intensity of the reflected beam of light over time via various techniques including, for example, shuttered light pulse imaging.

The capture device 20 may use a structured light to capture depth information. In such an analysis, patterned light (i.e., light displayed as a known pattern such as grid pattern, a stripe pattern, or different pattern) may be projected onto the scene via, for example, the IR light component 525. Upon striking the surface of one or more targets or objects in the scene, the pattern may become deformed in response. Such a deformation of the pattern may be captured by, for example, the 3-D camera 526 and/or the RGB camera 528 (and/or other sensor) and may then be analyzed to determine a physical distance from the capture device to a particular location on the targets or objects. In some implementations, the IR light component 525 is displaced from the cameras 526 and 528 so triangulation can be used to determined distance from cameras 526 and 528. In some implementations, the capture device 20 will include a dedicated IR sensor to sense the IR light, or a sensor with an IR filter.

The capture device 20 may include two or more physically separated cameras that may view a scene from different angles to obtain visual stereo data that may be resolved to generate depth information. Other types of depth image sensors can also be used to create a depth image.

The capture device 20 may further include a microphone 530, which includes a transducer or sensor that may receive and convert sound into an electrical signal. Microphone 530 may be used to receive audio signals that may also be provided by hub computing system 12.

A processor 532 is in communication with the image camera component 523. Processor 532 may include a standardized processor, a specialized processor, a microprocessor, or the like that may execute instructions including, for example, instructions for receiving a depth image, generating the appropriate data format (e.g., frame) and transmitting the data to hub computing system 12.

A memory 534 stores the instructions that are executed by processor 532, images or frames of images captured by the 3-D camera and/or RGB camera, or any other suitable information, images, or the like. According to an example embodiment, memory 534 may include RAM, ROM, cache, flash memory, a hard disk, or any other suitable storage component. Memory 534 may be a separate component in communication with the image capture component 523 and processor 532. According to another embodiment, the memory 534 may be integrated into processor 532 and/or the image capture component 523.

Capture device 20 is in communication with hub computing system 12 via a communication link 536. The communication link 536 may be a wired connection including, for example, a USB connection, a FireWire connection, an Ethernet cable connection, or the like and/or a wireless connection such as a wireless 802.11b, g, a, or n connection. According to one embodiment, hub computing system 12 may provide a clock to capture device 20 that may be used to determine when to capture, for example, a scene via the communication link 536. Additionally, the capture device 20 provides the depth information and visual (e.g., RGB or other color) images captured by, for example, the 3-D camera 526 and/or the RGB camera 528 to hub computing system 12 via the communication link 536. In one embodiment, the depth images and visual images are transmitted at 30 frames per second; however, other frame rates can be used. Hub computing system 12 may then create and use a model, depth information, and captured images to, for example, control an application such as a game or word processor and/or animate an avatar or on-screen character.

Hub computing system 12 includes depth image processing and skeletal tracking module 550, which uses the depth images to track one or more persons detectable by the depth camera function of capture device 20. Module 550 provides the tracking information to application 552, which can be a video game, productivity application, communications application or other software application etc. The audio data and visual image data is also provided to application 552 and module 550. Application 552 provides the tracking information, audio data and visual image data to recognizer engine 554. In another embodiment, recognizer engine 554 receives the tracking information directly from module 550 and receives the audio data and visual image data directly from capture device 20.

Recognizer engine 554 is associated with a collection of filters 560, 562, 564, . . . , 566 each comprising information concerning a gesture, action or condition that may be performed by any person or object detectable by capture device 20. For example, the data from capture device 20 may be processed by filters 560, 562, 564, . . . , 566 to identify when a user or group of users has performed one or more gestures or other actions. Those gestures may be associated with various controls, objects or conditions of application 552. Thus, hub computing system 12 may use the recognizer engine 554, with the filters, to interpret and track movement of objects (including people).

Capture device 20 provides RGB images (or visual images in other formats or color spaces) and depth images to hub computing system 12. The depth image may be a set of observed pixels where each observed pixel has an observed depth value. For example, the depth image may include a two-dimensional (2-D) pixel area of the captured scene where each pixel in the 2-D pixel area may have a depth value such as distance of an object in the captured scene from the capture device. Hub computing system 12 will use the RGB images and depth images to track a user's or object's movements.

Figure 6:
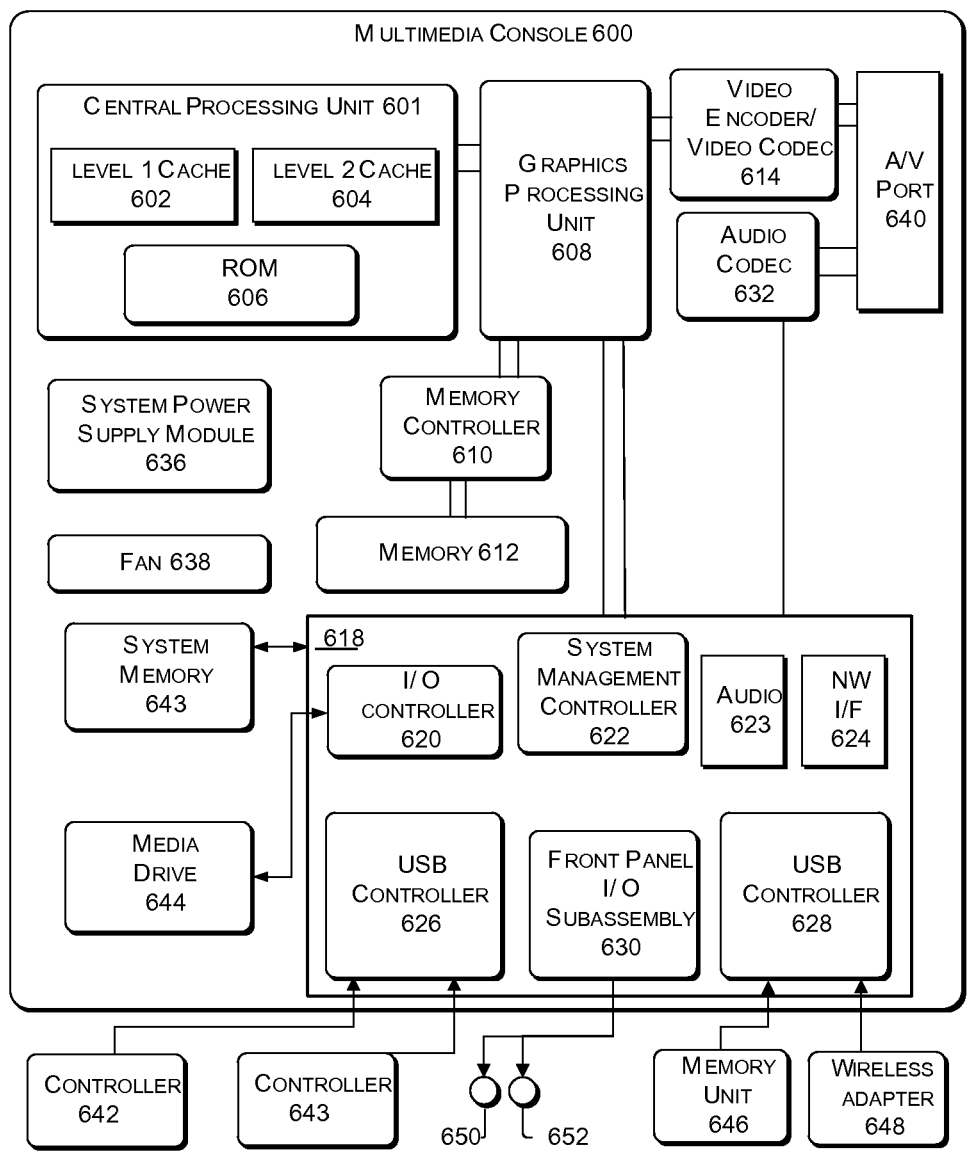
FIG. 6 is a block diagram of one embodiment of a computing system that can be used to implement the hub computing system 12 described herein.

FIG. 6 illustrates an example embodiment of a computing system that may be used to implement hub computing system 12. As shown in FIG. 6, the multimedia console 600 has a central processing unit (CPU) 601 having a level 1 cache 602, a level 2 cache 604, and a flash ROM 606. The level 1 cache 602 and a level 2 cache 604 temporarily store data and hence reduce the number of memory access cycles, thereby improving processing speed and throughput. CPU 601 may be provided having more than one core, and thus, additional level 1 and level 2 caches 602 and 604. The flash ROM 606 may store executable code that is loaded during an initial phase of a boot process when the multimedia console 600 is powered on.

A GPU 608 and a video encoder/video codec (coder/decoder) 614 form a video processing pipeline for high speed and high resolution graphics processing. Data is carried from the graphics processing unit 608 to the video encoder/video codec 614 via a bus. The video processing pipeline outputs data to an A/V (audio/video) port 640 for transmission to a television or other display. A memory controller 610 is connected to the GPU 608 to facilitate processor access to various types of memory 612, e.g., RAM.

The multimedia console 600 includes an I/O controller 620, a system management controller 622, an audio processing unit 623, a network (NW) interface (I/F) 624, a first USB host controller 626, a second USB controller 628 and a front panel I/O subassembly 630 that are preferably implemented on a module 618. The USB controllers 626 and 628 serve as hosts for peripheral controllers 642 and 643, a wireless adapter 648, and an external memory device 646 (e.g., flash memory, external CD/DVD ROM drive, removable media, etc.). The network interface 624 and/or wireless adapter 648 provide access to a network (e.g., the Internet, home network, etc.) and may be any of a wide variety of various wired or wireless adapter components including an Ethernet card, a modem, a BLUETOOTH® module, a cable modem, and the like.

System memory 643 is provided to store application data that is loaded during the boot process. A media drive 644 is provided and may comprise a DVD/CD drive, Blu-Ray Disk™ drive, hard disk drive, or other removable media drive, etc. The media drive 644 may be internal or external to the multimedia console 600. Application data may be accessed via the media drive 644 for execution, playback, etc. by the multimedia console 600. The media drive 644 is connected to the I/O controller 620 via a bus, such as a Serial ATA bus or other high speed connection (e.g., IEEE 1394 serial bus interface).

The system management controller 622 provides a variety of service functions related to assuring availability of the multimedia console 600. The audio processing unit 623 and an audio codec 632 form a corresponding audio processing pipeline with high fidelity and stereo processing. Audio data is carried between the audio processing unit 623 and the audio codec 632 via a communication link. The audio processing pipeline outputs data to the A/V port 640 for reproduction by an external audio user or device having audio capabilities.

The front panel I/O subassembly 630 supports the functionality of the power button 650 and the eject button 652, as well as any LEDs (light emitting diodes) or other indicators exposed on the outer surface of the multimedia console 600. A system power supply module 636 provides power to the components of the multimedia console 600. A fan 638 cools the circuitry within the multimedia console 600.

The CPU 601, GPU 608, memory controller 610, and various other components within the multimedia console 600 are interconnected via one or more buses, including serial and parallel buses, a memory bus, a peripheral bus, and a processor or local bus using any of a variety of bus architectures. Such architectures can include a PCI bus, PCI-Express bus, etc.

When the multimedia console 600 is powered on, application data may be loaded from the system memory 643 into memory 612 and/or caches 602, 604 and executed on the CPU 601. The application may present a graphical user interface that provides a consistent user experience when navigating to different media types available on the multimedia console 600. In operation, applications and/or other media contained within the media drive 644 may be launched or played from the media drive 644 to provide additional functionalities to the multimedia console 600.

The multimedia console 600 may be operated as a standalone system by simply connecting the system to a television or other display. In this standalone mode, the multimedia console 600 allows one or more users to interact with the system, watch movies, or listen to music. However, with the integration of broadband connectivity made available through the network interface 624 or the wireless adapter 648, the multimedia console 600 may further be operated as a participant in a larger network community. Additionally, multimedia console 600 can communicate with processing unit 4 via wireless adaptor 648.

FIG. 1, discussed previously, depicts one HMD device 2 (considered to be a type of mobile terminal) in communication with one hub computing device 12 (referred to as a hub). In another embodiment, multiple mobile terminals can be in communication with a single hub. Each of the mobile terminals will communicate with the hub using wireless communication, as described above. In such an embodiment, much of the information that is useful to all of the mobile terminals can be computed and stored at the hub and transmitted to each of the mobile terminals. For example, the hub will generate the model of the environment and provide that model to all of the mobile terminals in communication with the hub. Additionally, the hub can track the location and orientation of the mobile terminals and of the moving objects in the room, and then transfer that information to each of the mobile terminals.

Figure 7:
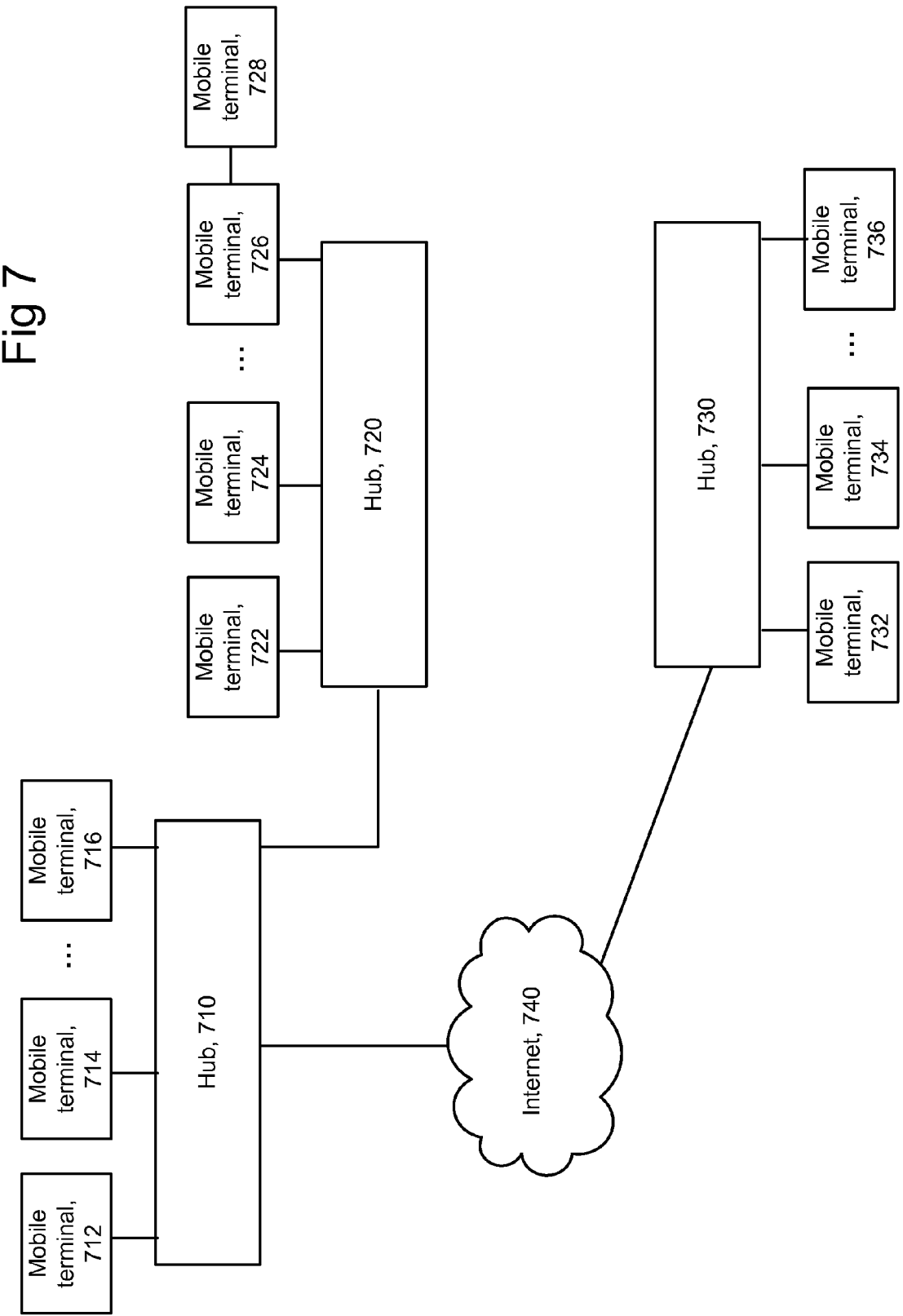
FIG. 7 is a block diagram depicting a multi-user system.

The system could include multiple hubs, with each hub including one or more mobile terminals. The hubs can communicate with each other directly or via the Internet (or other networks). For example, FIG. 7 is a block diagram depicting a multi-user system, including hubs 710, 720 and 730. Hub 710 communicates directly to hub 720. Hub 710 communicates to hub 730 via the Internet. Hub 710 communicated with mobile terminals 712, 714, . . . , 716. Hub 720 communicates with mobile terminals 722, 724, . . . , 726. Hub 730 communicates with mobile terminals 732, 734, . . . , 736. Each of the mobile terminals communicate with their respective hub via wireless communication as discussed above. If these hubs are in a common environment, then each of the hubs can provide a portion of the model of the environments, or one hub can create the model for the other hubs. Each of the hubs will track a subset of moving objects and share that information with the other hubs, which will in turn share the information with the appropriate mobile terminals. Sensor information for the mobile terminals will be provided to their respective hubs and then shared to the other hubs for eventual sharing to the other mobile terminals. Thus, information shared between hubs can include skeleton tracking, information about the models, various states of applications, and other tracking. The information communicated between the hubs and their respective mobile terminals include tracking information of moving objects, the state and physics updates for the world models, geometry and texture information, video and audio, and other information used to perform the operations described herein.

Additionally, mobile terminal can communicate directly with one another, such as mobile terminals 726 and 728. Also, the mobile terminals can be of the same or different types. In one example, the mobile terminals 726 and 728 are HMD devices worn by respective users that communicate via, e.g., a Wi-Fi®, BLUETOOTH® or IrDA® link. In another example, mobile terminal 726 is a HMD device and the mobile terminal 728 is a cell phone (or tablet or PC) such as in FIG. 8 which communicate via Wi-Fi®, BLUETOOTH® (such as in FIG. 9A) or IrDA® link, to provide the scenarios in FIGS. 22, 30E and 30F, discussed further below. In another approach, mobile terminal 726 as a HMD device could communicate with mobile terminal 724 as a cell phone via the hub 720 using, e.g., Wi-Fi®, BLUETOOTH® or IrDA® link. In a BLUETOOTH® implementation, terminals 724 and 726 could be slave devices of the hub 720 as a master device, so that the terminals 724 and 726 exchange messages via the hub 720.

At least one control circuit/processor can be provided, e.g., by the hub computing system 12, processing unit 4, control circuit 136, processor 610, CPU 420, GPU 422, processor 532, console 600 and/or circuitry 812 (discussed below in connection with FIG. 8). The at least one control circuit/processor may execute instructions stored on one or more tangible, non-transitory processor-readable storage devices for achieving the functionality described herein. The storage device, as a computer-readable media, can be provided, e.g., by memory 344, cache 424, RAM 426, flash memory 434, memory 430, memory 534, memory 612, cache 602 or 604, memory 643, memory unit 646 and/or memory 810 (discussed below in connection with FIG. 8).

A hub can also communicate data, e.g., wirelessly, to a HMD device for rendering an augmented reality image from a perspective of the user, based on a current orientation and/or location of the user's head which is transmitted to the hub. The data for rendering the augmented reality image can be in synchronism with content displayed on a video display screen. In one approach, the data for rendering the augmented reality image includes image data for controlling pixels of the augmented reality display to provide an augmented reality image in a specified virtual location. The augmented reality image can include a 2-D or 3-D object as discussed further below which is rendered from the user's current perspective. The image data for controlling pixels of the augmented reality display can be in a specified file format, for instance, where individual frames of images are specified.

Furthermore, the hub can communicate data to the HMD device for rendering an augmented reality image. In another approach, the image data for rendering the augmented reality image is obtained from another source than the hub, such as via a local storage device which is included with the HMD or perhaps carried by the user's person, e.g., in a pocket or arm band, and connected to the head-mounted via a wire or wirelessly.

Figure 8:
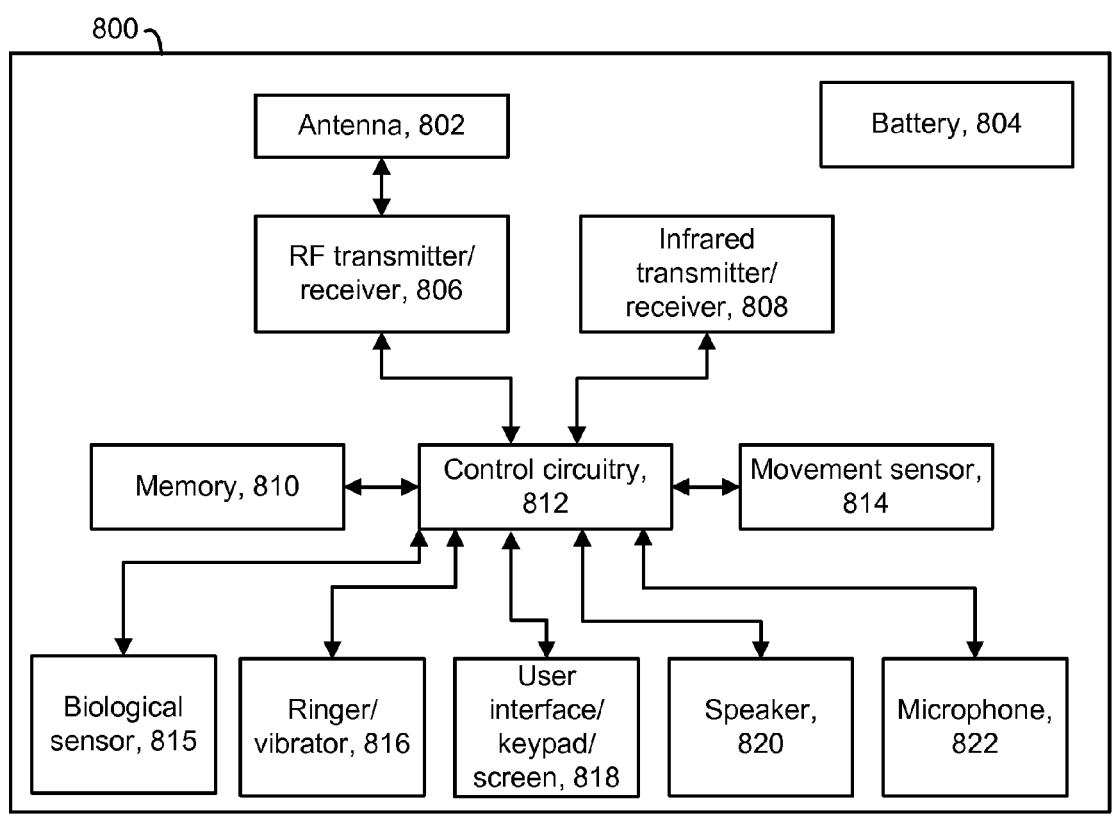
FIG. 8 depicts a block diagram of a mobile terminal which is a cell phone.

FIG. 8 depicts a block diagram of a mobile terminal 800 which is a cell phone. As mentioned in connection with FIG. 7, an HMD device can communicate directly with another mobile terminal. Exemplary electronic circuitry of a typical cell phone is depicted. The circuitry includes control circuitry 812 that can include one or more microprocessors, and storage or memory 810 (e.g., non-volatile memory such as ROM and volatile memory such as RAM) which stores processor-readable code which is executed by one or more processors of the control circuitry 812 to implement the functionality described herein. The control circuitry 812 also communicates with RF transmit/receive circuitry 806 which in turn is coupled to an antenna 802, with an infrared transmitted/receiver 808, and with a movement sensor 814 such as an accelerometer. An accelerometer can be provided, e.g., by a micro-electromechanical system (MEMS) which is built onto a semiconductor chip. Acceleration direction, as well as orientation, vibration and shock can be sensed. The control circuitry 812 further communicates with a ringer/vibrator 816, a UI keypad/screen 818, a speaker 820, and a microphone 822. A battery 804 is also provided.

The control circuitry 812 controls transmission and reception of wireless signals. During a transmission mode, the control circuitry 812 provides a voice signal from microphone 822, or other data signal, to the transmit/receive circuitry 806. The transmit/receive circuitry 806 transmits the signal to a remote station (e.g., a fixed station, operator, other cellular phone or mobile terminal such as an HMD device, etc.) via antenna 802. The ringer/vibrator 816 is used to signal an incoming call, text message or other notification. During a receiving mode, the transmit/receive circuitry 806 receives a voice or other data signal from a remote station or mobile terminal through the antenna 802. A received voice signal is provided to the speaker 820 while other received data signals are also processed appropriately.

A biological sensor 815 can detect a biological metric such as heart rate, pupil dilation amount, body temperature, blood pressure or blood glucose level, of the cell phone user. A heart rate can be detected using an infrared sensor or EKG sensor for instance, which is interface to the cell phone. Another technique (available as a downloadable application from www.instantheartrate.com/android.jsp) uses the video camera of a standard cell phone to analyze an image of the finger to determine heart rate. Another technique (available as a downloadable application from http://itunes.apple.com/app/iheart-pulse-reader/id300289653?mt=8) uses the microphone or accelerometer of a standard cell phone to determine heart rate. The accelerometer could be used to quantify an amount of movement of the user, such as when the user is dancing or swaying during a karaoke performance. In this case, an increase amount of movement can be an indication of an increased level of interest in the performance.

The mobile terminal 800 can enter a mode in which it communicates with a HMD device in different ways. In one approach, the user provides a manual command to launch an application to communicate with a HMD device. In another approach, the mobile terminal automatically launches such an application, such as in response to determining its location. The location can be determined by a GPS device, or by sensing electromagnetic (EM) signals which are present in a location and correlating the signals with a location. For example, the location can be learned from an identifier of a wireless network, such as an SSID of a Wi-Fi® signal. The SSID can be used to access a database which yields the corresponding location. Skyhook Wireless, Boston, Mass., provides a Wi-Fi® Positioning System (WPS) in which a database of Wi-Fi® networks is cross-referenced to latitude, longitude coordinates and place names for use in location-aware applications for cell phones and other mobile devices.

Figure 9A:
FIG. 9A depicts a system in which a master device, such as the cell phone 800 of FIG. 8, and the HMD device 2 of FIG. 1, communicate.

FIG. 9A depicts a system in which a master device, such as the cell phone 800 of FIG. 8, and the HMD device 2 of FIG. 1, communicate. As mentioned, a HMD device can communicate with another mobile terminal such as a cell phone, PC or the like using, e.g., a Wi-Fi®, BLUETOOTH® or IrDA® link. Here, the slave device communicates directly with the master device. For example, the cell phone can communicate an identifier of a name or affiliation of a user of the cell phone, and/or information regarding a level of interest of the user of the cell phone in a speaking or singing performance of a user of the HMD device. The slave device is synchronized to a clock of the master device to allow the slave device and a master device to exchange messages (such as audio and/or control data) at specified times. The information regarding a level of interest and the identifier can be composited and sent in the messages. Moreover, the slave device can establish a connection with a master device in a connection-oriented protocol so that the slave device and the master device are said to be paired or connected.

In an example approach which is used in the BLUETOOTH® protocol, the master device enters an inquiry state to discover other devices in the area. This can be done in response to a manual user command or in response to detecting that the cell phone is in a certain location, for instance. In the inquiry state, the master device (a local device) generates an inquiry hopping (channel changing) sequence. This inquiry hopping sequence is derived from the master device's clock and the chosen inquiry access code. This hopping sequence covers a 32-channel subset of the available 79 BLUETOOTH® channels. Once a master device generates an inquiry hopping sequence, it broadcasts inquiry messages as it sequentially switches to each channel defined in the hopping sequence.

Discoverable devices (remote devices such as the HMD device 2) will periodically enter the inquiry scan state. In this state, the discoverable devices hop according to the inquiry scan hopping sequence, which is also based on the inquiry access code and the local clock. If the remote device performing the inquiry scan receives an inquiry message, it enters the inquiry response state and replies with an inquiry response message. The inquiry response includes the remote device's address and clock, both of which are needed to establish a connection. All discoverable devices within the broadcast range will respond to the device inquiry.

After obtaining and selecting a remote device's address, the master device enters the paging state to establish a connection with the remote device. In the paging state, the master device generates a hopping sequence based on the remote device's address and estimated current clock. The paging device then repeatedly sends page messages as it hops through the generated sequence of channels. If a master device allows other remote devices to connect to it, it will periodically enter the page scan state, in which a hopping sequence is generated based on the local address and clock.

When the remote device receives a page packet, it responds to the master device with a page response packet. Upon receiving the response, the master device sends a Frequency Hopping Synchronization (FHS) packet to the slave device. The FHS packet includes the master's address and clock. Once the slave device receives the FHS packet, it sends an acknowledgement to the master device. When the master device receives the acknowledgement, it generates a new hopping sequence from its own address and its own clock. The slave device then uses the master's address and the master's clock to generate a hopping sequence identical to the master's hopping sequence. The identical hopping sequences allow the slave devices to hop on common channels while remaining connected. Once the paging process is complete, the devices move to the connection state. The master device sends a poll packet to the slave device verifying that the transition from the page hopping sequence to the new hopping sequence is successful. If successful, the two devices continue frequency hopping in a pseudo-random pattern based on the master device's address and clock for the duration of the connection.

Although the BLUETOOTH® protocol is provided as an example, any type of protocol can be used in which mobile terminals communicate one another. Optionally, multiple slave devices can be synchronized to one master device.

Figure 9B:
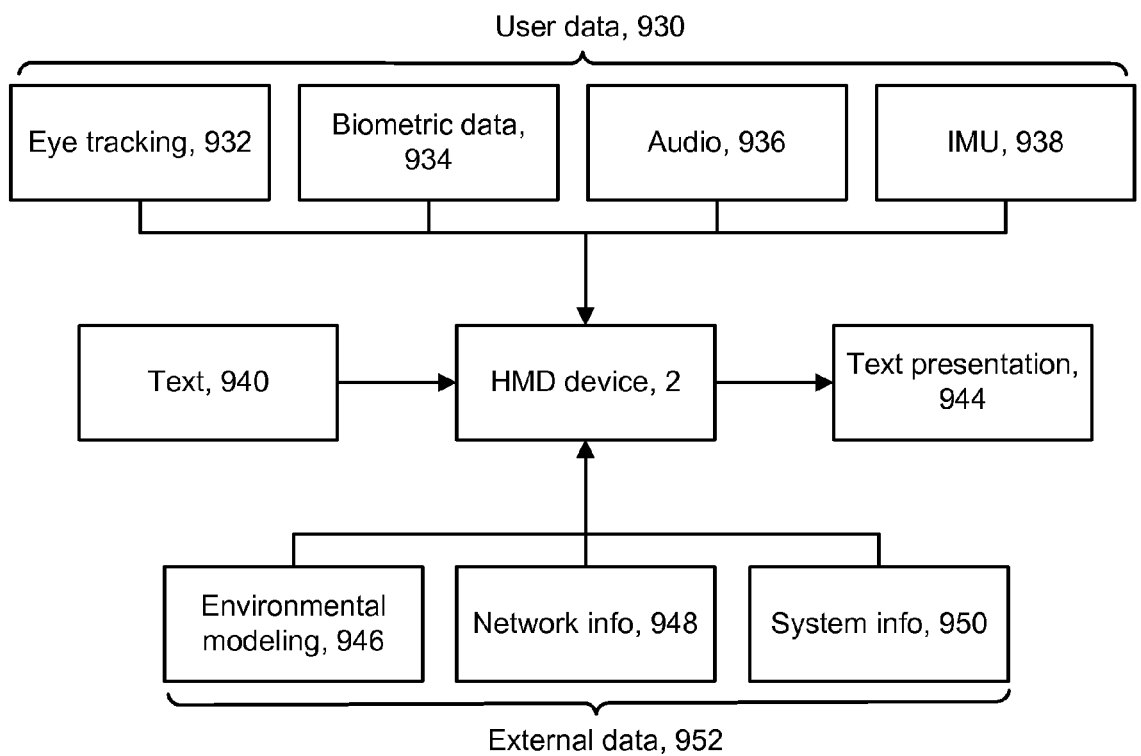
FIG. 9B depicts a system for updating a display of augmented reality images including text on the HMD device of FIG. 1.

FIG. 9B depicts a system for updating a display of augmented reality images including text on the HMD device of FIG. 1. The system includes the HMD device 2 at the center. Inputs to the HMD device include user data 930 (from eye tracking 932, biometric data, audio 936 and IMU 938), text 940 and external data 952 (from environmental modeling 946, network info 948 and system info 950). An output includes a text presentation 944 as part of an augmented reality image. These and other aspects of the system are discussed below.

The system can include various aspects. A first aspect relates to text consumption and speech by a user. This can include a gaze estimation features which determines if words are stared at. A higher-order gaze estimation logic determines if words are read and understood. A speech recognition application can enable a karaoke type word coloration (or other method) that follows along with words as they are vocalized. Also, the system can provide text advances or page turns as the end of passage is read. A second aspect relates to text and speech recognition by the HMD device. Speech recognition determines if text is spoken. Gaze estimation determines if words are looked at and understood, adjusting pace of word presentation accordingly. This can be accomplished by multiple methods, including: tracking words in sequence and not advancing until a sentence is read (rather than the last word looked at), and integrating IMU data to determine if the user was distracted. Also, accents/speech patterns/speed of reading/concentration can be recognized, measured and recorded to refine future text presentation refinement. A third aspect relates to text presentation by the system. The speed of text presentation can auto-adjust for speed and other factors. For karaoke type applications, speech recognition can allow for the addition of a line/text representing a word or words that the user is currently vocalizing, in addition to text representing a word or words that the user should be currently vocalizing.

Figure 10:
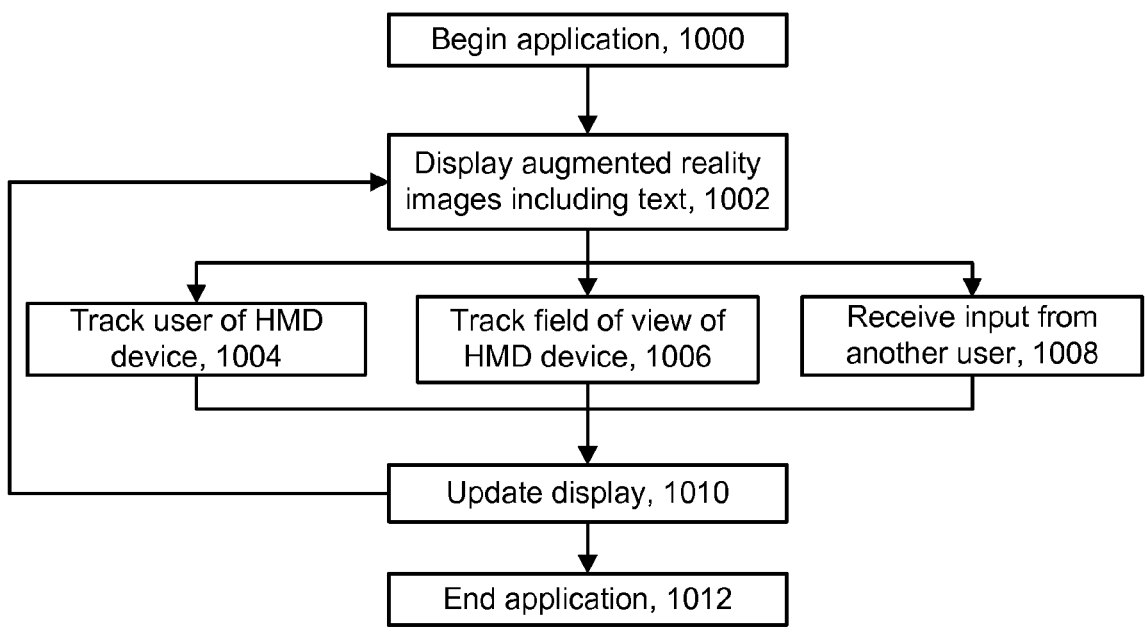
FIG. 10 is a flow chart describing one embodiment of a process for updating a display of augmented reality images including text on the HMD device of FIG. 1.

FIG. 10 is a flow chart describing one embodiment of a process for updating a display of augmented reality images including text on the HMD device of FIG. 1. At step 1000, an application of the HMD device begins. Step 1002 includes displaying augmented reality images including text. Step 1004 includes tracking the user of the HMD device, as explained further, e.g., in connection with FIG. 11. Step 1006 includes tracking a field of view of the HMD device, as explained further, e.g., in connection with FIG. 12. Step 1008 includes receiving input from another user, as explained further, e.g., in connection with FIG. 13. Step 1010 includes updating the display, as explained further, e.g., in connection with FIGS. 14, 15 and 16. Steps 1002-1010 are repeated while the application is executing. In some situations, the display is temporarily halted such as discussed in connection with step 1412 of FIG. 14. At step 1000, the application of the HMD device ends. The start and/or end of the application can be based on user commands such as gestures provided to the hub computing system, in one approach. Or, the start and/or end of the application can be triggered in response to determining that the user is looking in a certain direction, or is in a certain location, based on knowledge of an orientation and/or location of the user's head as obtained from one or more sensors of the HMD device.

Figure 11:
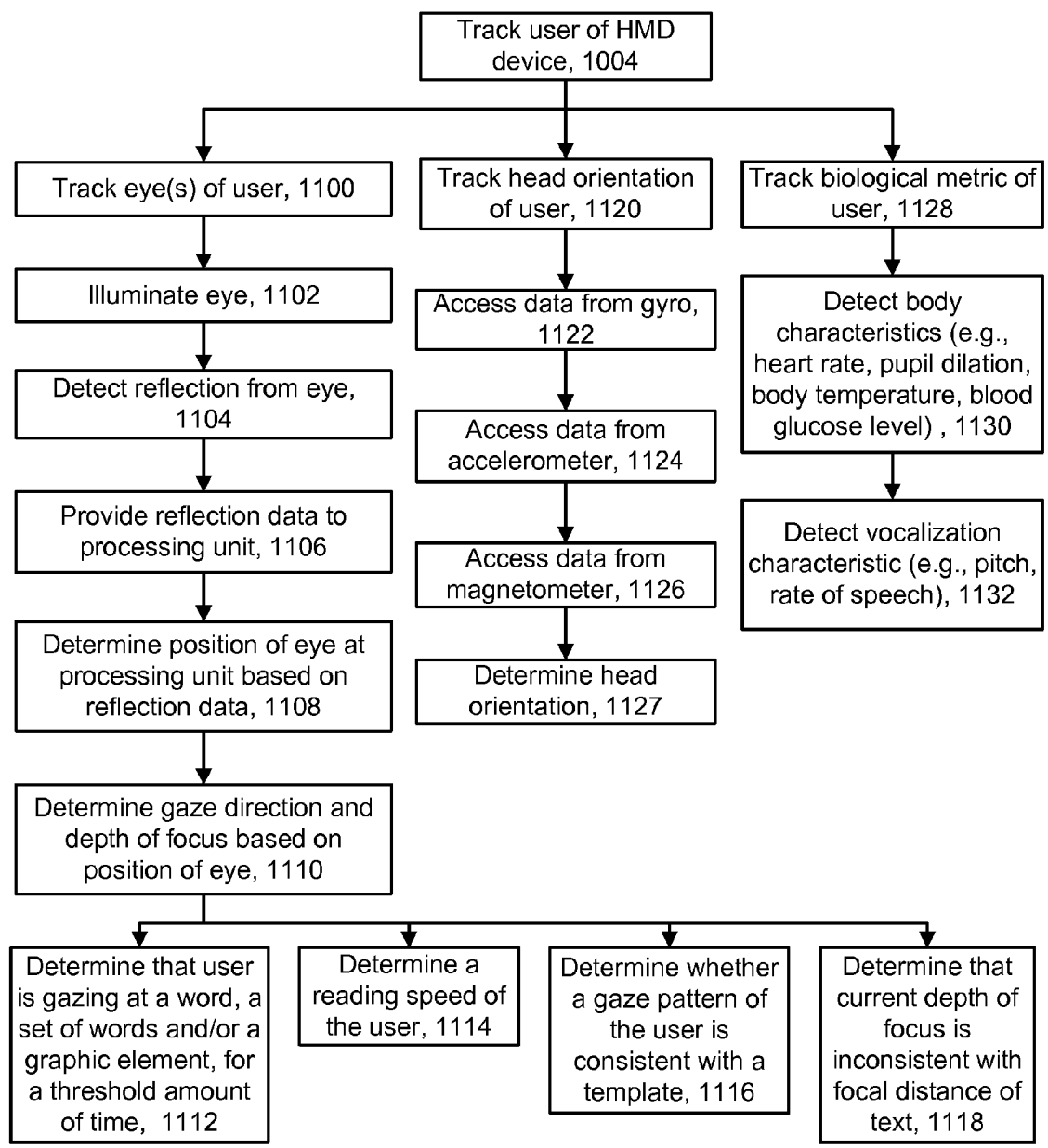
FIG. 11 is a flow chart describing further details of step 1004 of FIG. 10 for tracking a user of an HMD device.

FIG. 11 is a flow chart describing further details of step 1004 of FIG. 10 for tracking a user of an HMD device. The tracking of a user can be classified into three different branches relating to eye tracking, head orientation tracking and biological metric tracking, in one approach.

Step 1100 identifies a branch for tracking one or both eyes of a user using the technology described above. In step 1102, the eye is illuminated, e.g., using infrared light from several LEDs of the eye tracking illumination 134A in FIG. 3. In step 1104, the reflection from the eye is detected using one or more infrared eye tracking cameras 134B. In step 1106, the reflection data is provided to the processing unit 4. In step 1108, the processing unit 4 determines the position of the eye based on the reflection data, as discussed above. Step 1110 determines a gaze direction (e.g., discussed further in connection with FIG. 18) and a focal distance (e.g., discussed further in connection with FIGS. 19 and 20).

In one approach, the location of the eyeball can be determined based on the positions of the cameras and LEDs. The center of the pupil can be found using image processing, and ray which extends through the center of the pupil can be determined as a visual axis. In particular, one possible eye tracking technique uses the location of a glint, which is a small amount of light that reflects off the pupil when the pupil is illuminated. A computer program estimates the location of the gaze based on the glint. Another possible eye tracking technique is the Pupil-Center/Corneal-Reflection Technique, which can be more accurate than the location of glint technique because it tracks both the glint and the center of the pupil. The center of the pupil is generally the precise location of sight, and by tracking this area within the parameters of the glint, it is possible to make an accurate prediction of where the eyes are gazing.

In another approach, the shape of the pupil can be used to determine the direction in which the user is gazing. The pupil becomes more elliptical in proportion to the angle of viewing relative to the straight ahead direction.

In another approach, multiple glints in an eye are detected to find the 3d location of the eye, estimate the radius of the eye, and then draw a line through the center of the eye through the pupil center to get a gaze direction. For example, see Hennessey et al. "A Single Camera Eye-Gaze Tracking System with Free Head Motion," ETRA 2006, San Diego, Calif., ACM p. 88, pp. 87-94, incorporated herein by reference.

Step 1112 determines that a user is gazing at a word, a set of words and/or a graphic element, for at least a threshold amount of time. A graphic element is a 2d or 3d element such as a picture or image which includes text and/or non-text elements. A graphic element could include text as well, such as a bar chart which includes bars and axes as non-text elements and descriptive text as text elements. A graphic element can include a rendering or a hologram.

Step 1114 includes determining a reading speed of the user. Step 1116 includes determining whether a gaze pattern of the user is consistent with a template. For steps 1112, 1114 and 1116, see FIGS. 25 and 26 for further details. Step 1118 includes determining that a current focal distance is inconsistent with a focal distance of text in the augmented reality image. See FIGS. 19 and 20 for further details.

Step 1120 identifies a branch for tracking a head orientation of the user using the technology described above. At step 1122, the processing unit 4 accesses data from three axis gyro 132B. In step 1124, the processing unit 4 accesses data from three axis accelerometer 132C. In step 1126, the processing unit 4 accesses data from three axis magnetometer 132A. Based on these inputs, the processing unit 4 can determine a head orientation, at step 1127. In another approach, the processing unit 4 refines orientation data which is received from the hub computing device 12 with the data from the gyro, accelerometer and magnetometer.

Step 1128 identifies a branch for tracking a biological metric of a user using the technology described above. Step 1130 includes detecting a body characteristic such as heart rate, pupil dilation, body temperature and blood glucose level using appropriate sensors. For example, as mentioned, the ear lobe clip 7 of the HMD device of FIG. 1 can be used to continuously or intermittently monitor the user's heart rate. Pupil dilation can be determined using the eye tracking camera 134B of FIG. 3, which continuously obtains an image of the eye and pupil. The amount of pupil dilation can be determined based on the pupil diameter, for instance. Body temperature can be measured in one approach, by a temperature sensor which contacts the user's skin. In another approach, the eye tracking camera can determine the user's body temperature. For example, see S. R. Johnson et al., in "Thermographic Eye Temperature as an Index to Body Temperature in Ponies," Journal of Equine Veterinary Science, Volume 31, Issue 2, February 2011, Pages 63-66, incorporated herein by reference. S. R. Johnson et al. indicate that Infrared thermography (IRT) is a passive, remote, and noninvasive method of measuring surface temperatures, and that select surface locations, such as the eye, could indicate body temperature.

The HMD device could display a message indicating that the user may have a fever, based on the body temperature.

The eye tracking camera could also be used to determine blood glucose level. For example, U.S. Pat. No. 6,975,892, "Methods for non-invasive analyte measurement from the conjunctiva," incorporated herein by reference, provides a technique which floods the conjunctiva of the subject with electromagnetic radiation in the mid-infrared range and measures analyte concentrations such as glucose concentration based on a signature of mid-infrared radiation reflected back to the instrument.

Step 1132 includes determining a vocalization characteristic of the user such as pitch and rate of speech. The user's voice, while speaking aloud or singing, for instance, can be captured by the microphone 110 (FIG. 1) and processed in the analog and/or frequency domain to determine the characteristic. A rate of speech can be determined is various ways. For example, U.S. Pat. No. 6,629,072, "Method of an arrangement for speech recognition with speech velocity adaptation," incorporated herein by reference, measures a speech velocity based on the number of spoken and recognized words per time unit, or the number of recognized phonemes in a predefined time interval. Moreover, a speech recognition circuit can be employed in some approaches. For example, see US 2011/0066426, "Real-Time Speaker-Adaptive Speech Recognition Apparatus and Method," incorporated herein by reference. The speech rate can be updated continuously, or averaged over a specified time interval such as a few seconds.

Generally, any type of biological metric, or combination of metrics, can be used to determine a physical and/or mental state of the user, and to adjust the augmented reality images, including the presentation of text, accordingly. For example, the biological metric may indicate that the user is in an excited state, based on a heart rate or pupil dilation being above a threshold, and may therefore be speaking too quickly. In response, the HMD device could provide a message in the augmented reality image (and/or provide an audible message/sound in an earpiece) informing the user to speak more slowly (see FIG. 30A). Or, the biological metric may indicate that the user is in a depressed state, based on a heart rate or pupil dilation being below a threshold, and may therefore be speaking too slowly or softly. In response, the HMD device could provide a message informing the user to speak more quickly and/or loudly (see FIG. 30A). A low body temperature or low blood glucose level could also be associated with a depressed state. Similarly, a direct measurement of the speech rate can result in a "slow down" message when the rate exceeds an upper threshold, or in a "faster" message when the rate falls below a lower threshold. A speech pitch which exceeds a threshold level could also indicate an excited state.

The HMD device can also provide a message regarding an amount of calories burned in a period of time such as during a dance application, based on the heart rate.

Similarly, the biological metrics can be used to determine a state of another user, such as user/audience member who is listening to a subject user deliver a speech or sing. Consider a subject user giving a speech, lecture or the like by reading text in the augmented reality images of a HMD device worn by the subject user. If the another user is in an excited state, such as determined by a mobile terminal (e.g., another HMD, a cell phone, etc.) of the another user, and transmitted to the HMD device of the subject user, the HMD device of the subject user can provide a corresponding message. In response, the subject user might adjust the presentation such as to cover the current subject matter in additional detail. If the another user is in a depressed or subdued state, the HMD device of the subject user can provide a corresponding message. In response, the subject user might adjust the presentation such as to cover the current subject matter in less detail and move more quickly to new material, or to tell a joke or interesting anecdote.

Consider a subject singing a karaoke song by singing the text in the augmented reality images of a HMD device worn by the subject user. If the another user is in an excited state, the HMD device of the subject user can provide a corresponding message. In response, the subject will gain confidence from the positive feedback. If the another user is in a depressed state, the HMD device of the subject user can provide a corresponding message. In response, the subject user might adjust the song such as to sing louder or make gestures.

Figure 12:
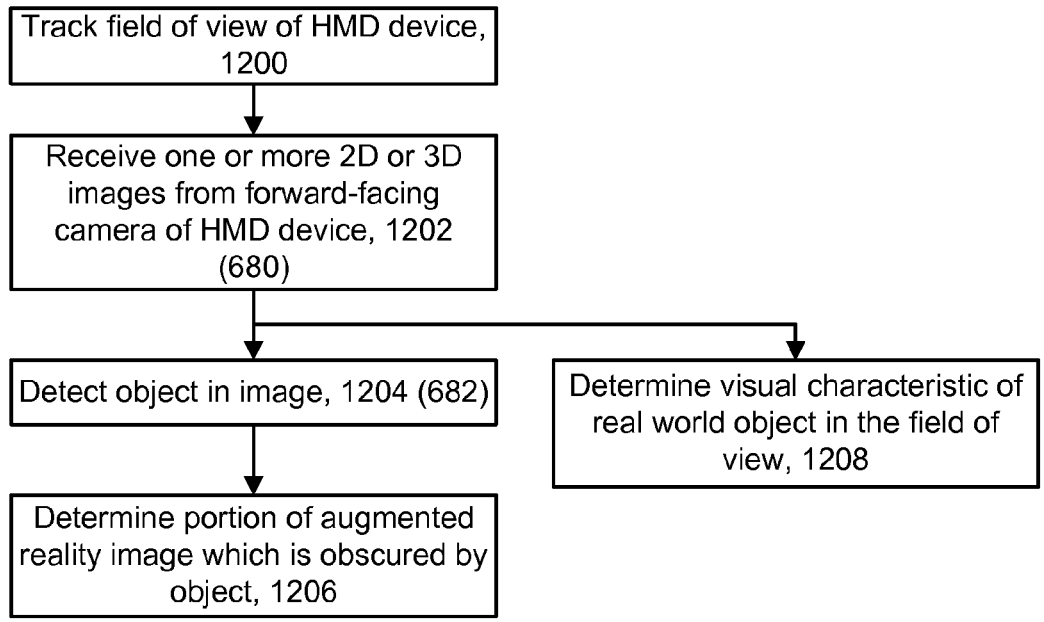
FIG. 12 is a flow chart describing further details of step 1006 of FIG. 10 for tracking a field of view of an HMD device.

FIG. 12 is a flow chart describing further details of step 1006 of FIG. 10 for tracking a field of view of an HMD device. Step 1200 identifies a start of the process for tracking a field of view of an HMD device. Step 1202 includes receiving one or more depth images from one or more forward-facing depth cameras of the HMD device, as discussed above. In one branch of the process, step 1204 includes detecting a (real world) object in the image. For example, this can include processing the depth image to determine edges of the object. Step 1206 includes determining a portion of the augmented reality image which is obscured by the object. For example, this can be a portion of the augmented reality image which is behind the object, e.g., at a greater depth from the HMD device. See FIGS. 21A and 21B for further details. In another branch of the process, which can be performed alternatively or additionally, step 1208 includes determining a visual characteristic (such as color, pattern, brightness or reflectivity) of a real world object in the field of view of the one or more forward-facing depth cameras. See FIG. 30C for further details.

Figure 13:
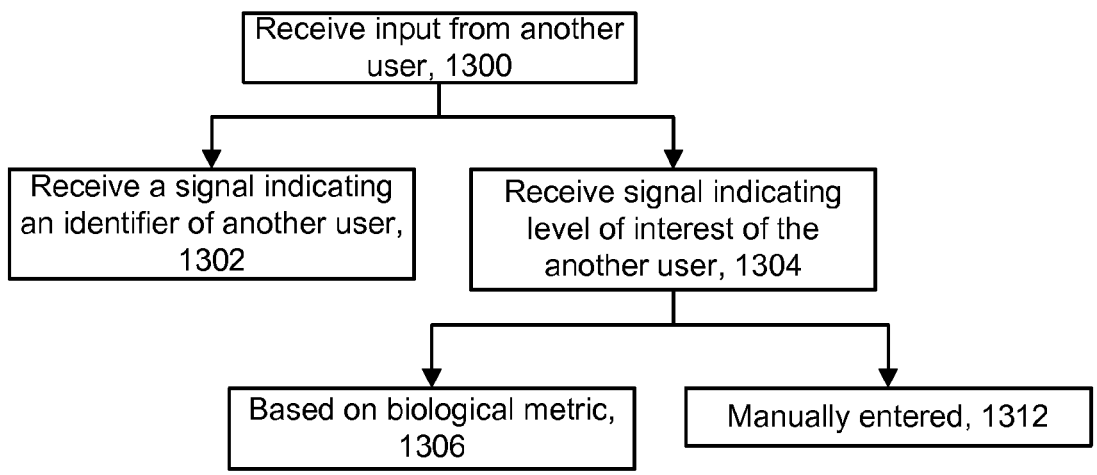
FIG. 13 is a flow chart describing further details of step 1008 of FIG. 10 for receiving an input from another user.

FIG. 13 is a flow chart describing further details of step 1008 of FIG. 10 for receiving an input from another user. Step 1300 identifies a start of the process for receiving an input from another user, such as from a mobile terminal of the another user. The another user is different than a subject user for whom the augmented reality images on the HMD device are to be adjusted based on the input. In one branch, step 1302 includes receiving a signal indicating an identifier of the another user. The signal could be received from a mobile terminal such as a cell phone of the another user. For example, the identifier could be a cell phone number of the another user. The HMD device of the subject user can access a list of friends/contacts of the subject user which are indexed by telephone number, and look up identifying information of the another user, such as a name or affiliation (e.g., company, school, sports team, etc.) of the another user.

In another branch, step 1304 includes receiving a signal indicating a level of interest of the another user. The signal could be received from a mobile terminal such as a cell phone of the another user. For example, the signal can include a biological metric of the another user (step 1306). The HMD device of the subject user can process the biological metric to determine a state of the another user. For example, a more excited state can be correlated with a higher level of interest. Or, the mobile terminal of the another user can process the biological metric locally to provide a value which indicates a level of interest, e.g., low, medium high, or 1-10, etc., based on the state of the another user. This value can be encoded and transmitted by the cell phone to the HMD device, so that it is received and processed directly by the HMD device of the subject user. In another approach, at step 1312, the user manually enters a level of interest, e.g., via a user interface of the mobile terminal. This value can similarly be encoded and transmitted by the cell phone to the HMD device. See FIG. 22A for further details.

Figure 14:
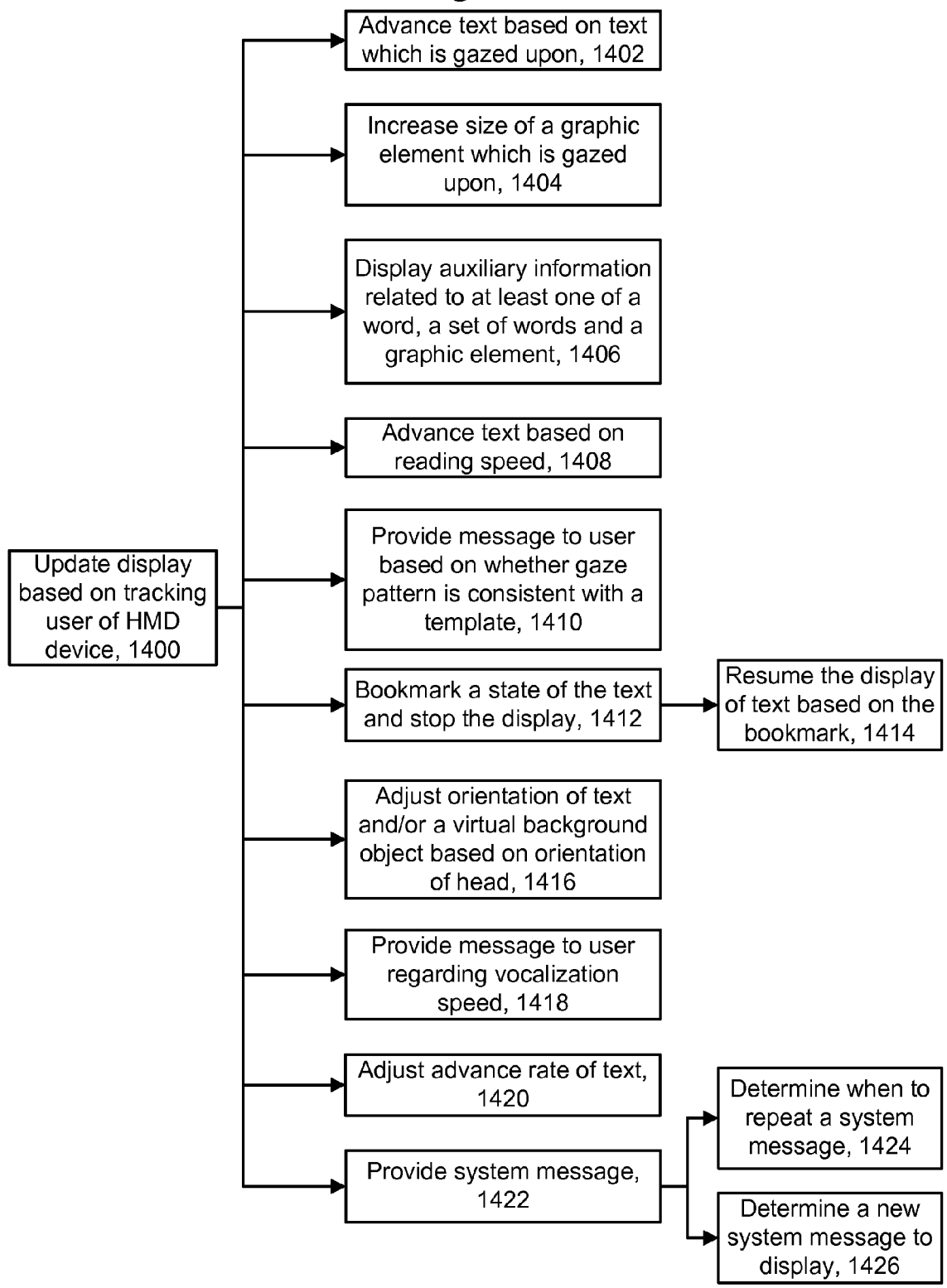
FIG. 14 is a flow chart describing further details of step 1010 of FIG. 10 for updating a display of an HMD based on tracking a user of the HMD device.

FIG. 14 is a flow chart describing further details of step 1010 of FIG. 10 for updating a display of an HMD based on tracking a user of the HMD device. Step 1400 (update display based on tracking user of HMD device) can be considered to be part of step 1010. One or more of several different steps can be performed. Step 1402 includes advancing text of the augmented reality image which is gazed upon. See FIG. 18. Step 1404 includes increasing a size of a graphic element which is gazed upon. See FIG. 25. Step 1406 includes displaying auxiliary information related to at least one of a word, a set of words and a graphic element. See FIG. 26. Step 1408 includes advancing text based on reading speed. See FIG. 18. Step 1410 includes providing a message to the user based on whether the gaze pattern is consistent with a template. See FIG. 27A. Step 1412 includes bookmarking a state of the text in the augmented reality image and stopping the display. See FIGS. 19 and 28. A subsequent step 1414 includes resuming the display of text based on the bookmark.

Step 1416 includes adjusting an orientation of text and/or a virtual object on which the text is displayed based on the orientation of the head. See FIGS. 29A and 29B. Step 1418 includes providing a message to the user regarding a vocalization speed, e.g., to talk faster or slower, as discussed previously. See also FIG. 30A. Step 1420 includes adjusting an advance rate of text. For example, in the case of scrolling text, the rate of scrolling can be adjusted to force the user to talk faster or slower. Step 1422 includes providing a system message to the user. See FIG. 30B. Subsequent steps can include determining when to repeat a system message (step 1424) and determining a new message to display (step 1426). For example, steps 1424 and 1426 can involve using gaze directions and patterns of the user to determine whether the system message was looked at, and whether the gaze directions and patterns are consistent with a minimum level of reading comprehension.

Figure 15:
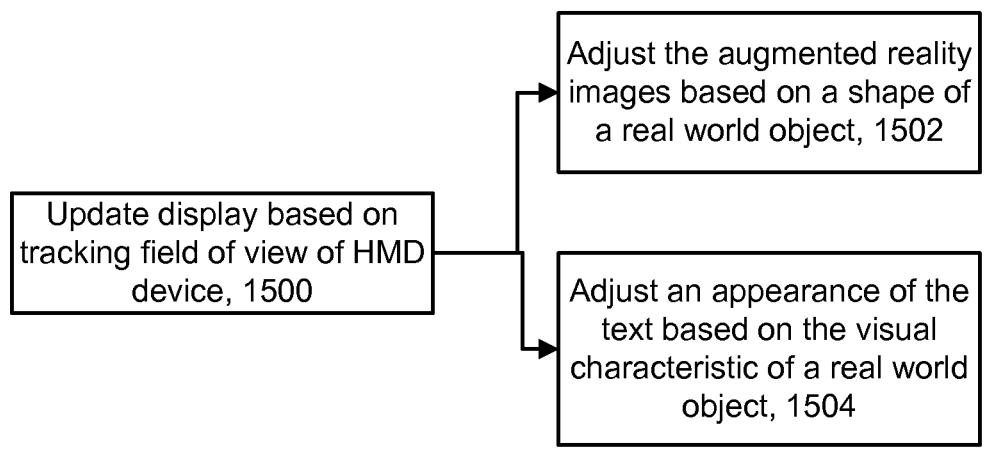
FIG. 15 is a flow chart describing further details of step 1010 of FIG. 10 for updating a display of an HMD based on tracking a field of view of the HMD device.

FIG. 15 is a flow chart describing further details of step 1010 of FIG. 10 for updating a display of an HMD based on tracking a field of view of the HMD device. Step 1500 (update display based on tracking field of view of HMD device) can be considered to be part of step 1010. Step 1502 includes adjusting the augmented reality images based on a shape of a real world object. See FIGS. 21A and 21B. Step 1504 includes adjusting an appearance of the text based on the visual characteristics of a real world object. See FIG. 30C.

Figure 16:
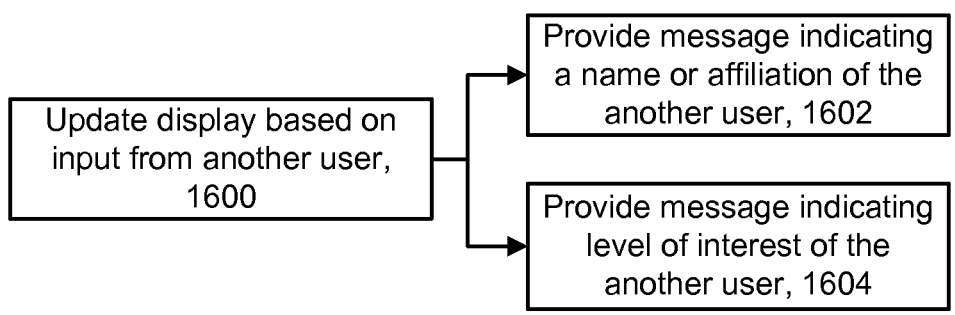
FIG. 16 is a flow chart describing further details of step 1010 of FIG. 10 for updating a display of an HMD based on input from another user.

FIG. 16 is a flow chart describing further details of step 1010 of FIG. 10 for updating a display of an HMD based on input from another user. Step 1600 (update display based on input from another user) can be considered to be part of step 1010. Step 1602 includes providing a message indicating a name or affiliation of the another user. See FIG. 30D. Step 1604 includes providing a message indicating a level of interest of the another user. See FIGS. 30E and 30F.

Figure 17A:
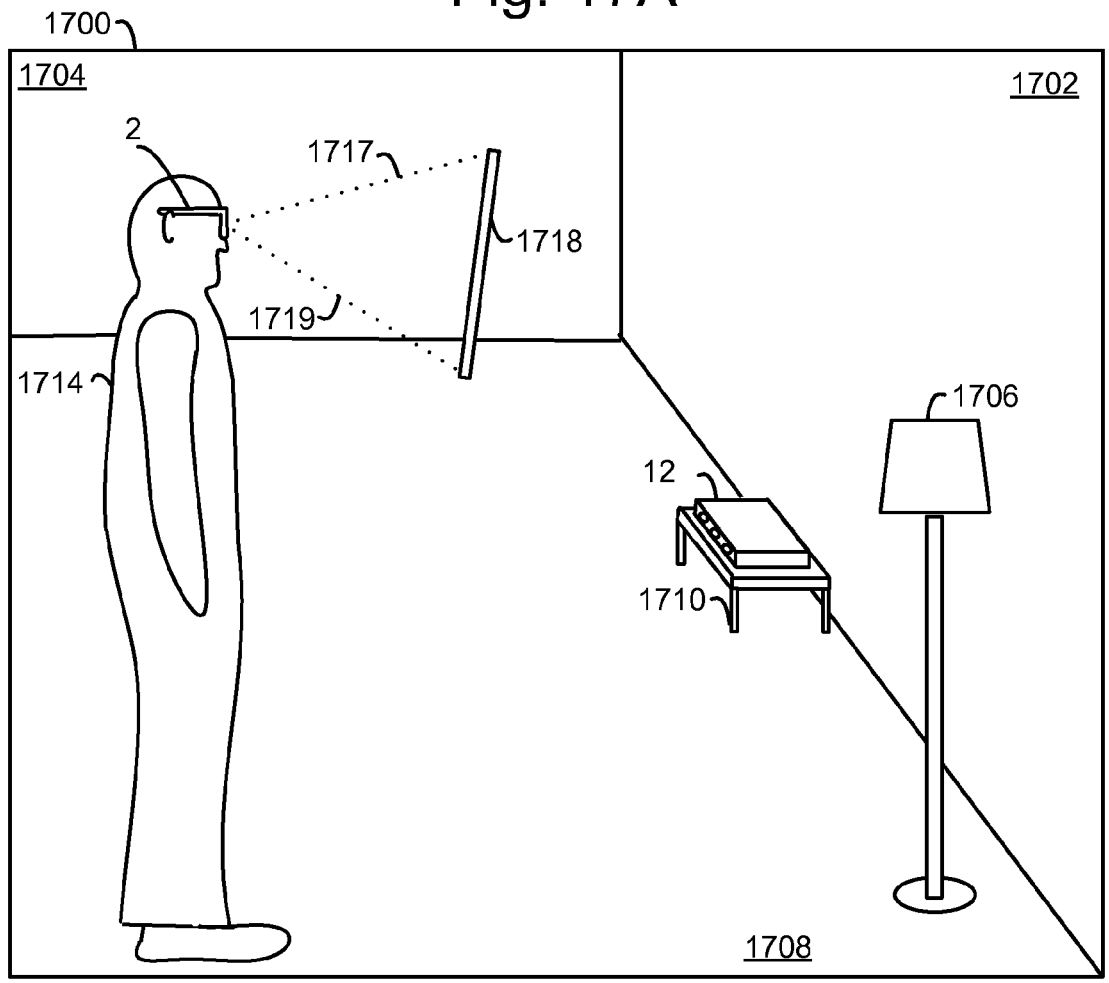
FIG. 17A depicts an example scenario in which a HMD device displays text on a virtual object in an augmented reality image 1718.

FIG. 17A depicts an example scenario in which a HMD device displays text on a virtual object in an augmented reality image 1718. A scene 1700 is depicted in which a user 1714 wearing the HMD device 2 is in a room which is a typical environment or space in which a HMD device 1716 can be used. The room includes a front wall 1702, side wall 1704 and floor 1708, and example furniture such as a lamp 1706 and table 1710 on which the hub 12 rests. A region 1718 is a side view of an augmented reality image. Upper and lower boundaries of a field of view of the augmented reality image are depicted by dotted lines 1717 and 1719, respectively.

Figure 17B:
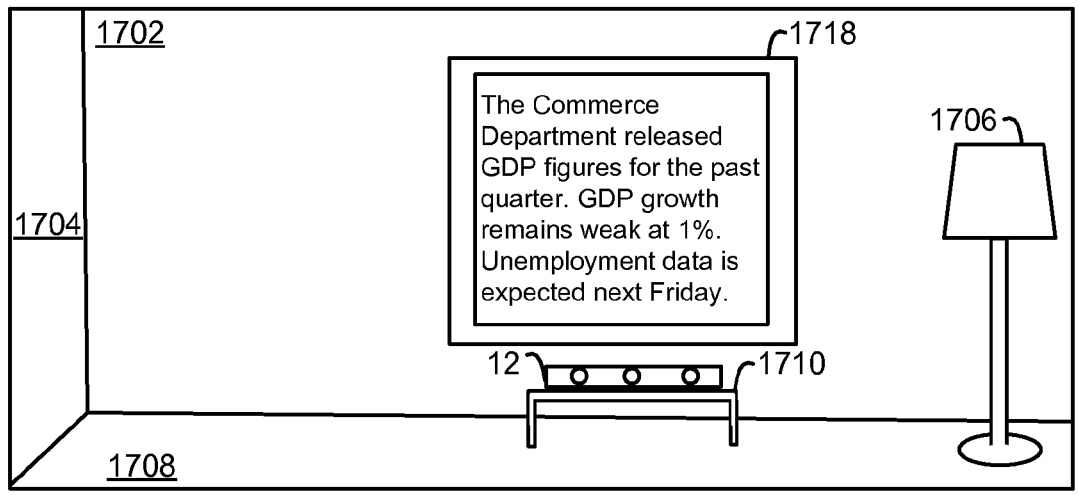
FIG. 17B depicts a user's view through the HMD device of the example scenario of FIG. 17A.

FIG. 17B depicts a user's viewpoint through the HMD of the example scenario of FIG. 17A. The augmented reality image 1718 can be a planar or non-planar virtual object which appears to exist in the real world but which is present only to the user of the HMD device. The virtual object can be considered to be an object or surface on which text of the augmented reality image appears. The virtual object can appear to be a book, newspaper, electronic book reader, or teleprompter, for instance. In one approach, the augmented reality image can appear to the user to be in a substantially fixed real world location, and registered to a real world environment such as a room. When the user's head orientation changes, the augmented reality image is re-computed and rendered by different pixels in the HMD device so that it appears to be fixed in space. In another approach, the augmented reality image can move as the HMD device moves due to changes in the user's head orientation. In another approach, the augmented reality image is in a fixed real world location for changes in the user's head orientation which are below a lower threshold level, and move as the HMD device moves for changes in the user's head orientation which are above an upper threshold level. In this example, the augmented reality image 1718 has text such as from a business news report.

Due to the see-through lenses of the HMD device, the user can continue to see the surrounding environment, including the walls 1702 and 1704, floor 1708, table 1710, hub 12, and lamp 1706. The virtual object 1718 can be provided in a default location relative to the HMD device, such as at a specified focal distance and in a specified field of view.

Figure 18:
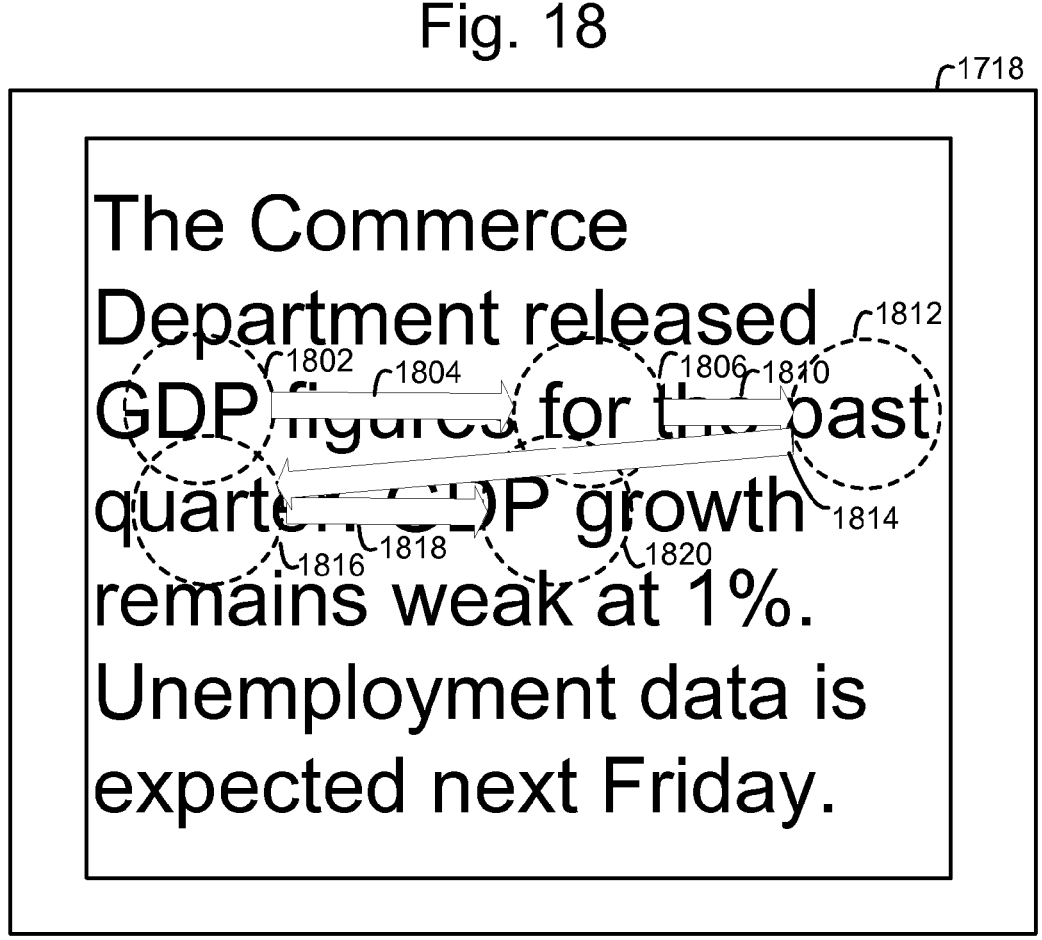
FIG. 18 depicts an example pattern of gaze directions when the user reads the text of the augmented reality image 1718 of FIG. 17B.

FIG. 18 depicts an example pattern of gaze directions when the user reads the text of the augmented reality image 1718 of FIG. 17B. The gaze direction can be determined for one or both eyes of a user. The gaze direction is a direction in which the user looks and is based on a visual axis, which is an imaginary line drawn, e.g., through the center of the pupil to the center of the fovea (within the macula, at the center of the retina). At any given time, a point of the augmented reality image that the user is looking at is a fixation point, which is at the intersection of the visual axis and the augmented reality image, at a focal distance from the HMD device. When both eyes are tracked, the orbital muscles keep the visual axis of both eyes aligned on the center of the fixation point. The visual axis can be determined, relative to a coordinate system of the HMD device, by the eye tracker. The augmented reality image can also be defined relative to the coordinate system of the HMD device so that it is not necessary to translate the gaze direction from the coordinate system of the HMD device to another coordinate system, such as a world coordinate system. An example of a world coordinate system is a fixed coordinate system of a room in which the user is located. Such a translation would typically require knowledge of the orientation of the user's head, and introduces additional uncertainties.

Example gaze locations 1802, 1806, 1812, 1816 and 1820 are depicted by dashed line circles, where the diameter of the circle represents a gaze location or fixation point with a certain degree of confidence. While reading, the eyes typically move between gaze locations for every few words. Transitions between the gaze locations (such as transitions 1804, 1810, 1814 and 1818) are referred to as saccades, and represent quick, simultaneous movements of both eyes in the same direction. The reading speed can be determined, e.g., as words per unit time, or lines of text per unit time. For example, if the gaze location transitions from 1802 to 1806 to 1812 in a time t1, since there are five words encompassed ("GDP figures for the past"), the reading rate is 5 words/t1. The reading rate can be determined over several words and smoothed to avoid sudden changes in the rate.

Figure 19:
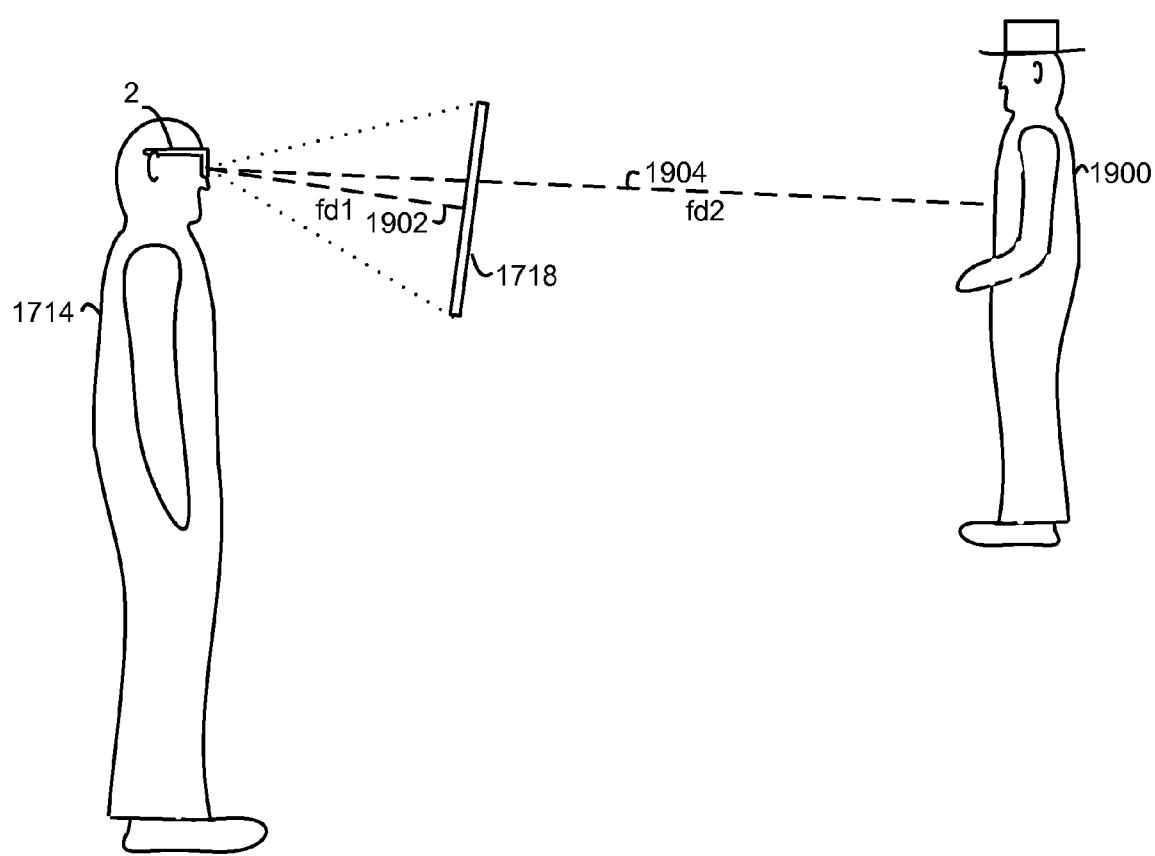
FIG. 19 depicts an example scenario in which a user changes a focal distance away from an augmented reality image.

FIG. 19 depicts an example scenario in which a user changes a focal distance away from an augmented reality image. A line 1902 represents a focal distance fd1 of the user's eyes when the user is looking at the augmented reality image 1718. A line 1904 represents a focal distance fd2>fd1 of the user's eyes when the user is looking at a real-world object 1900 such as a person which is at a different focal distance. The focal distance fd2 is inconsistent with a determination that the user is looking or gazing at the augmented reality image. The augmented reality image is provided at a known focal distance from the user's eyes, such as 3-6 feet, which is a comfortable reading distance. In one approach, a range of focal distances may be defined which is consistent with the user gazing at the augmented reality image. The range may be fixed, or it may be proportional to the focal distance of the augmented reality image. An example of a fixed range is +/−2 feet. For example, if fd1 is 4 feet, the range is 2-6 feet. An example of a proportional range is +/−10% feet. For example, if fd1 is 4 feet, the range is 3.6-4.4 feet.

Figure 28:
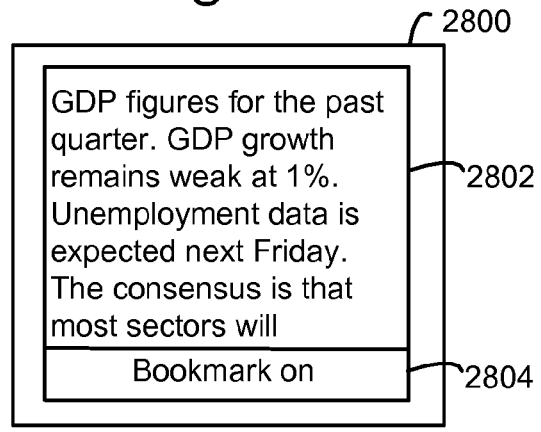
FIG. 28 depicts an example message when a bookmark is made in accordance with step 1412 of FIG. 14.

In practice, the user may be reading text from the augmented reality image 1718. The movement of the real world object 1900 such as a person entering the room or approaching on the street causes the user 1714 to focus on the object 1900, resulting in a change in the focal distance. In another example, the user 1718 is reading while waiting at a bus stop, and changes his focus to view an approaching bus. A change in the orientation of the user's head can also signal that the user is looking away from the augmented reality image. After some period of time, such as after boarding the bus and being seated, the user again focuses on the augmented reality image to resume reading it. In one approach, the HMD device stops displaying the augmented reality image when the focal distance moves sufficiently away from the augmented reality image. A wait time maybe imposed when the focal distance moves away before stopping the augmented reality image. In another approach, if the augmented reality image includes scrolling text, the scrolling can be stopped while the text is still displayed, when the focal distance moves away. After a wait time, the augmented reality image can be stopped. The state of the augmented reality image when it is stopped can be bookmarked, e.g., recorded. When the focal distance returns to the augmented reality image, the text can reappear starting from the bookmarked state, and can continue scrolling. A message can be displayed indicating that the bookmark is active (FIG. 28). The message can be stopped when the augmented reality image is stopped. It is also possible to stop the augmented reality image while continuing to display the message.

Figure 20:
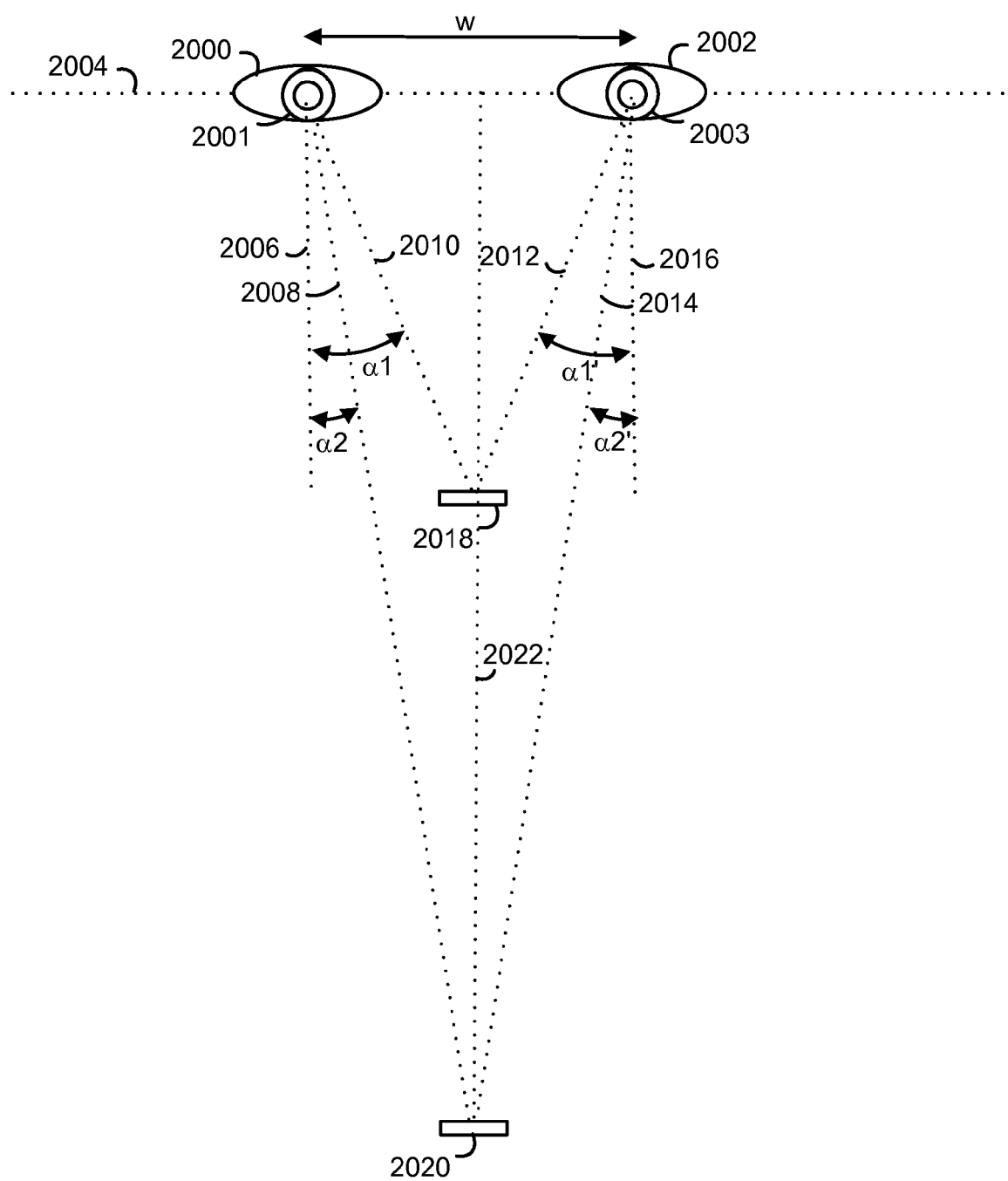
FIG. 20 depicts a calculation of a focal distance.

FIG. 20 depicts a calculation of a focal distance. Generally, a focal distance, or focal length, is a distance between a lens, such as the eye, and its focal point. The focal distance can also be considered as a distance between the HMD device and the focal point, due to the relative closeness of the eye and the HMD device. An axis 2004 extends between the eyes 2000 and 2002. An axis 2006 extends from the center of the pupil 2001 of the eye 2000, and an axis 2016 extends from the center of the pupil 2003 of the eye 2002. The axes 2004 and 2006 are orthogonal to the axis 2004 and represent a straight ahead direction of the user. When a user gazes at, and focuses on, an object (a real object, or a virtual object which is part of an augmented reality image), a focal distance can be determined which is a distance from the eye to a gaze location of the object. For example, when the user focuses on an object 2018, the eye 2000 has a visual axis 2010 which extends from the pupil 2001 to the object 2018 an angle α1 from the axis 2006, and the eye 2002 has a visual axis 2012 which extends from the pupil 2003 to the object 2018 at an angle α1' from the axis 2016. The angles α1 and α1' can be the same, such as when the object 2018 is centered between the user's eyes, or different, when the object 2018 is not centered between the user's eyes, but is offset to one side.

The angles of the visual axes vary as a known function of the focal distance, where the angle becomes smaller as the focal distance becomes larger, so that the focal distance can be determined from the angles of the visual axes, for one or both eyes. The eye tracking components can be used to determine the angles of the visual axes. For example, consider an object 2020, which is further at a greater focal distance than the object 2018. In this case, when the user focuses on the object 2020, the eye 2000 has a visual axis 2008 which extends from the pupil 2001 to the object 2020 an angle α2<α1 from the axis 2006, and the eye 2002 has a visual axis 2014 which extends from the pupil 2003 to the object 2020 at an angle α2' from the axis 2016. The angles α2 and α2' can be the same, such as when the object 2020 is centered between the user's eyes, or different, when the object 2020 is not centered between the user's eyes, but is offset to one side.

Figure 21A:
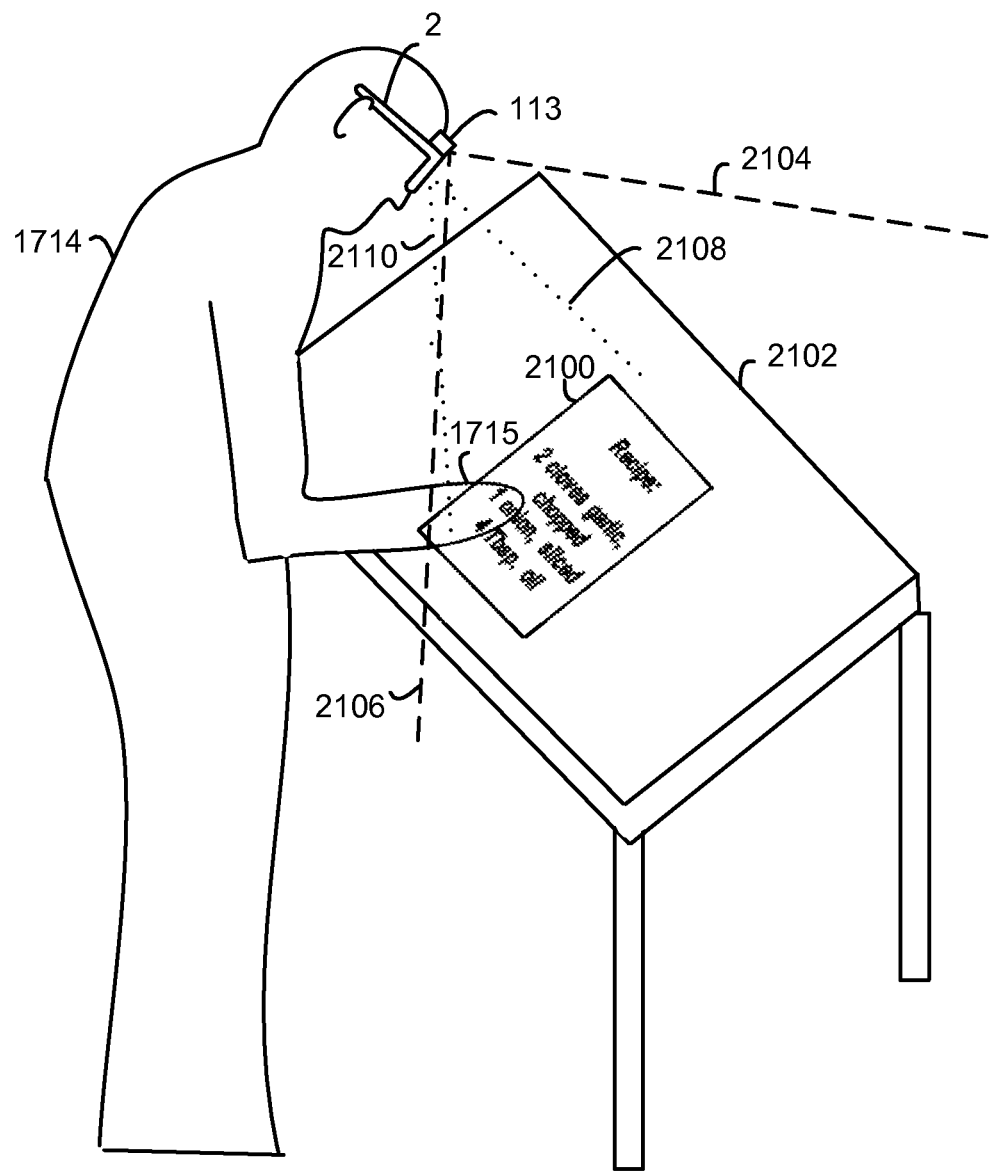
FIG. 21A depicts an example scenario in which a real world object passes between the user's eyes and an augmented reality image, and the augmented reality image is not adjusted.

FIG. 21A depicts an example scenario in which a real world object passes between the user's eyes and an augmented reality image, and the augmented reality image is not adjusted. The user 1714 is wearing the HMD device 2 with a forward-facing video camera 113. Lines 2108 and 2110 represent a field of view of an augmented reality image 2100, which appears as a paper or book on a table top 2102. The augmented reality image 2100 may have text such as a recipe. Lines 2104 and 2106 represent a field of view of the forward-facing video camera 113. One or more control circuits, as discussed previously, can use images from at least one forward-facing camera to determine when a real world object, such as the user's hand 1715, passes between at least one eye of the user and text on a virtual object of the augmented reality image 2100, in a field of view of the camera.

In one possible implementation, the one or more front-facing cameras on the HMD device obtain successive images of a scene, and each image is processed to identify an outline of a real world object in the scene. Optionally, if the camera has a depth sensing capability, a depth of the object from the camera can be determined. One or more edges/boundaries of the object are identified from the images, and data representing the edges is stored. A determination is then made as to whether the object overlaps a portion of the augmented reality image, that is, a portion of the augmented reality image is behind the object. For example, if the focal distance to the augmented reality image is greater than the depth of the object from the user, and the augmented reality image and the object have overlapping fields of view, the object overlaps a portion of the augmented reality image.

The result in FIG. 21A reduces the realism of the augmented reality image. To overcome this, the one or more control circuits can have the ability to control at least one microdisplay to adjust the augmented reality images based on a shape of the real world object, so that the augmented reality images do not appear to be rendered on at least a substantial portion (e.g., a majority, nearly all or all) of the real world object. This is shown n FIG. 21B.

Figure 21B:
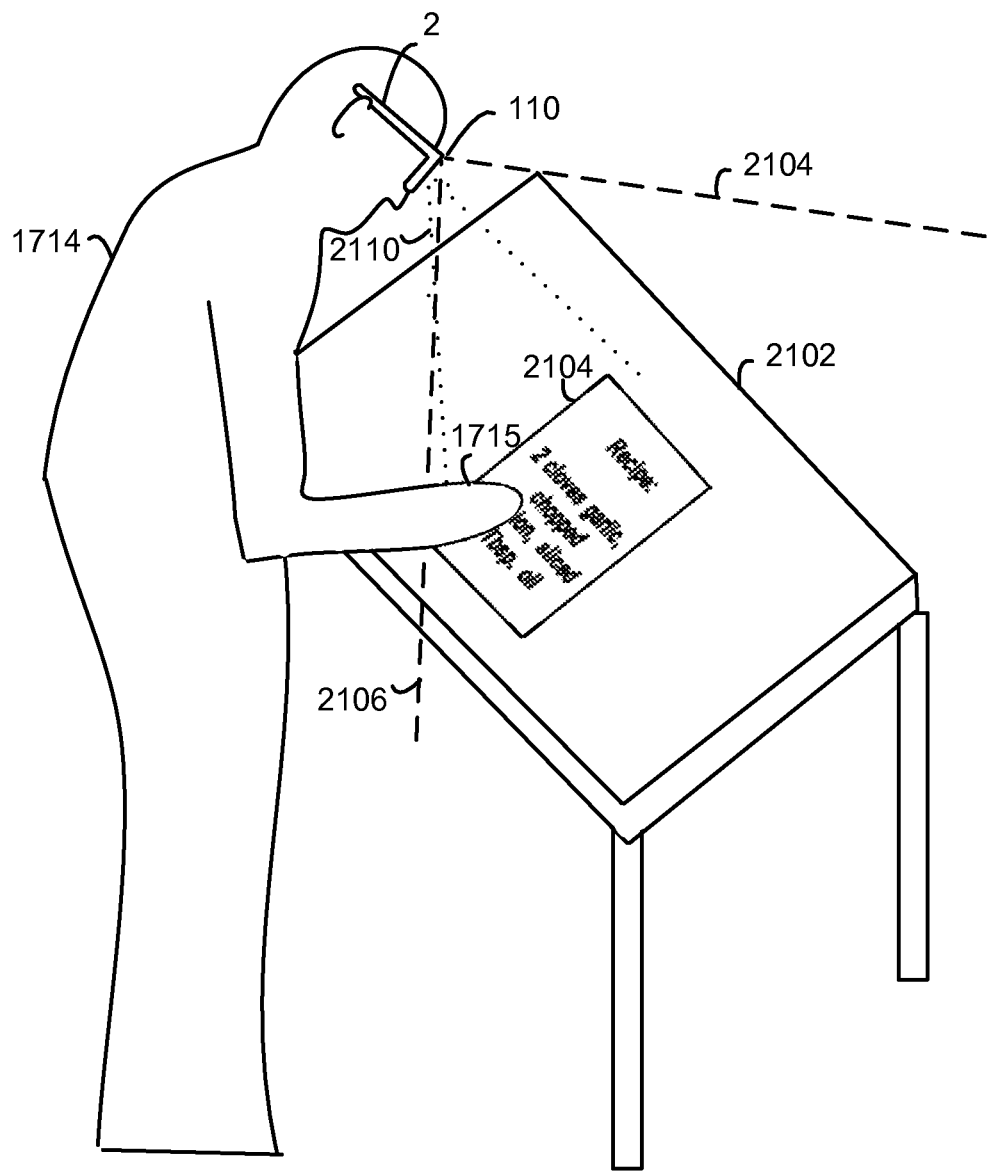
FIG. 21B depicts the example scenario of FIG. 21A where the augmented reality image is adjusted.

FIG. 21B depicts the example scenario of FIG. 21A where the augmented reality image is adjusted. By adjusting the augmented reality image when a real world object passes in front of it, the realism is enhanced. In particular, a portion of the augmented reality image which would coincide with the real world object is determined and not displayed in the augmented reality image.

Figure 22A:
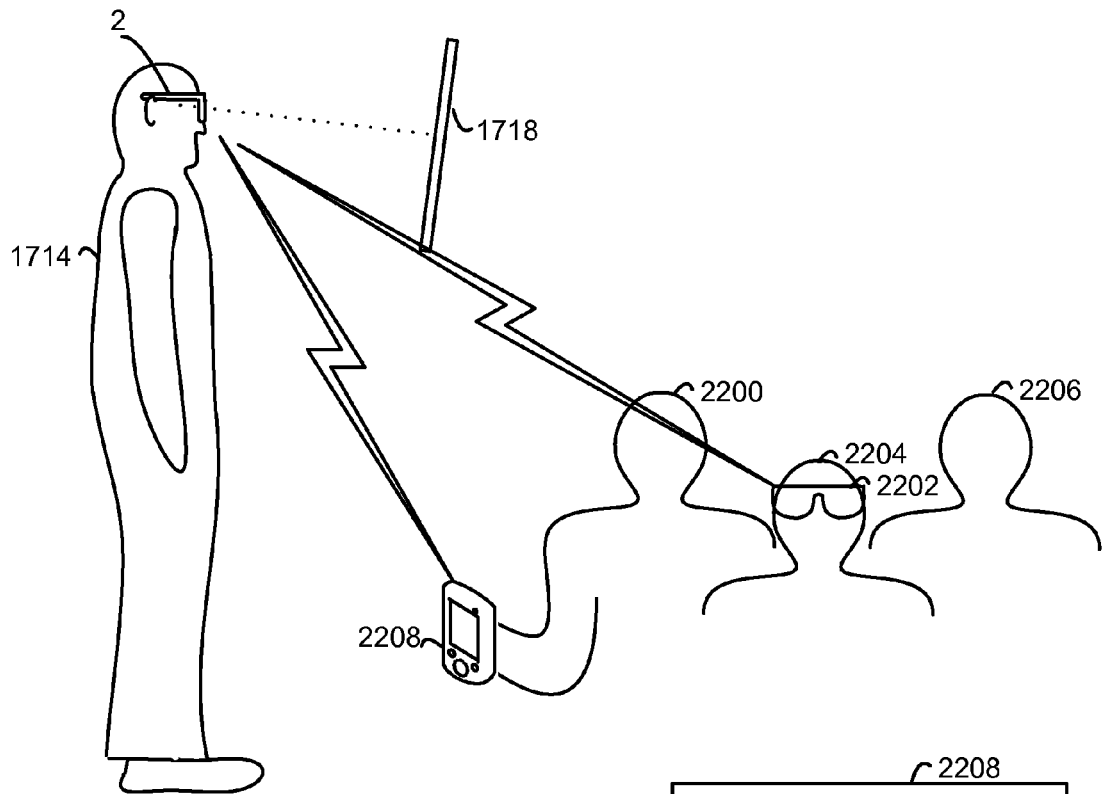
FIG. 22A depicts an example scenario related to step 1604 of FIG. 16 in which another user provides an input regarding a level of interest in a vocal presentation by the user of an HMD device.

FIG. 22A depicts an example scenario related to step 1604 of FIG. 16 in which another user provides an input regarding a level of interest in a vocal presentation by the user of an HMD device. The subject user 1714 provides a vocalization of text in the augmented reality image 1718, such as in a spoken presentation or a singing karaoke performance. Audience members 2200, 2204 and 2206 are other people who are listening to the performance. The audience members could be in the vicinity of the subject user 1714 or located remotely. The audience member 2200 is another user who uses a mobile terminal in the form of a cell phone 2208, shown in further detail in FIG. 22B. The audience member 2202 is another user who uses a mobile terminal in the form of an HMD device 2202, similar to the HMD device 2 of the subject user 1714. The mobile terminals 2208 and 2202 transmit wireless signals to the HMD device 2 for use in adjusting the augmented reality display. The mobile terminals 2208 and 2202 can also receive wireless signals from the HMD device 2 which indicate a status of the device, such as "Performance in progress."

Figure 22B:
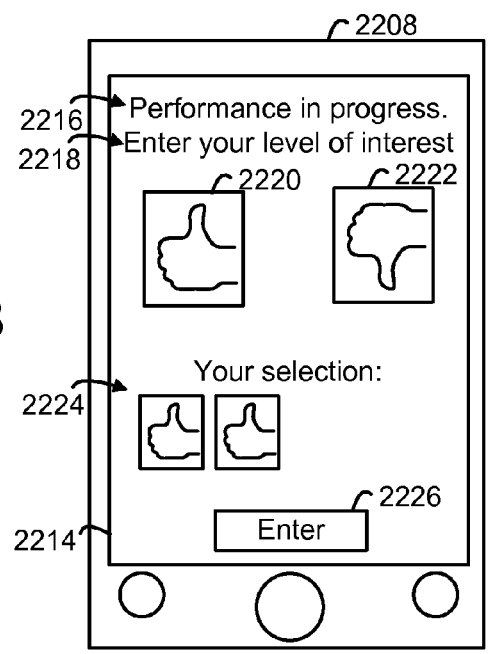
FIG. 22B depicts an example of a user interface of the mobile terminal 2208 of FIG. 22A.

FIG. 22B depicts an example of a user interface of the mobile terminal 2208 of FIG. 22A. The cell phone may include a touch screen 2214 which display a user interface. The user interface provides text 2216 (Performance in progress) which indicates the HMD device is executing an application, such as by advancing text in an augmented reality image, by which the user 1714 provides a vocal performance. The user interface also provides text 2218 which instructs the user 2200 to enter a level of interest in the performance. A "thumbs up" icon 2220 can be selected to indicate approval of the performance, and a "thumbs down" icon 2222 can be selected to indicate disapproval of the performance. Multiple presses can indicate a higher degree of approval or disapproval. A region 2224 of the user interface indicates that two "thumbs up" have been selected. An "enter" button 2226 can be selected to cause the cell phone 2208 to send the level of interest as an input to the HMD device 2. The user 2200 can change the level of interest at different times during the performance.

In another approach, the HMD device 2202 can determine a current level of interest of the user 2204 based on one or more biological metrics of the user 2204, as discussed previously. The HMD device 2202 can determine a level of interest based on the one or more biological metrics, and periodically send the level of interest as an input to the HMD device 2. Or, the HMD device 2202 can periodically send the one or more biological metrics as an input to the HMD device 2, where the HMD device 2 translates the one or more biological metrics to a level of interest.

Figure 23:
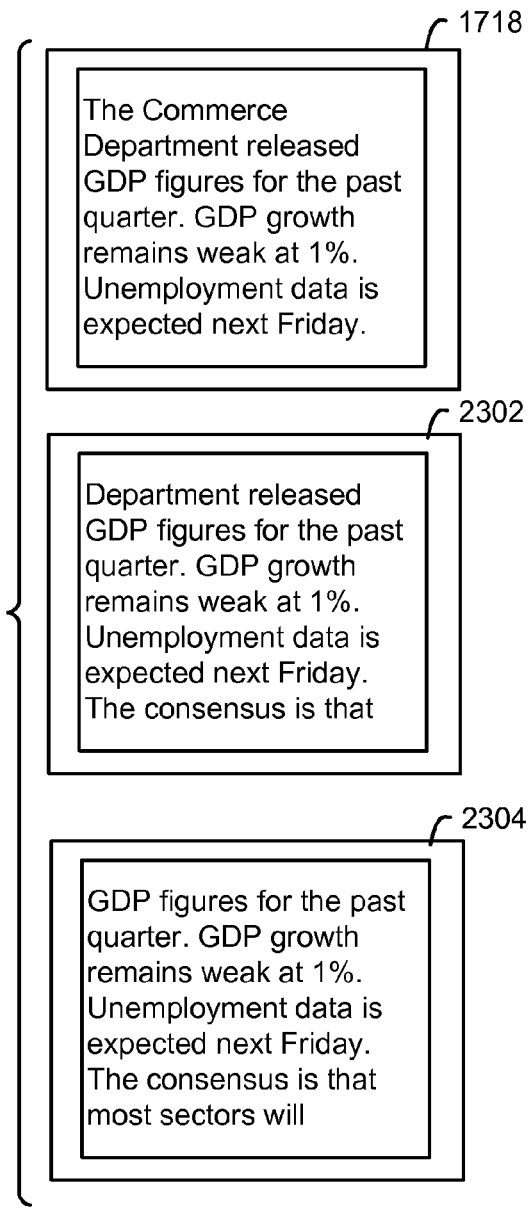
FIG. 23 depicts an example of vertically advancing text whose rate can be controlled in accordance with step 1402 of FIG. 14.

FIG. 23 depicts an example of vertically advancing text whose rate can be controlled in accordance with step 1402 of FIG. 14. The augmented reality image 1718 from FIG. 17B is repeated. The text advances up by one line in the augmented reality image 2302, and again by another line in the augmented reality image 2304.

Figure 24:
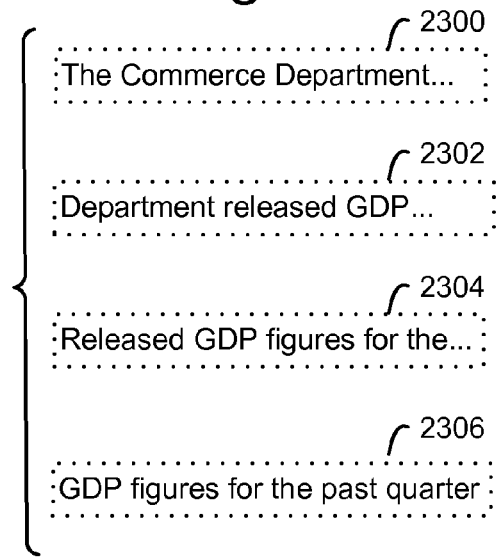
FIG. 24 depicts an example of horizontally advancing text whose rate can be controlled in accordance with step 1402 of FIG. 14.

FIG. 24 depicts an example of horizontally advancing text whose rate can be controlled in accordance with step 1402 of FIG. 14. The text advances to the left in the successive augmented reality images 2300, 2302, 2304 and 2306

FIG. 25 depicts an example of an enlarged graphic element in accordance with step 1404 of FIG. 14. The augmented reality image 2500 includes a text portion 2504 and a graphical element 2502. A gaze location 2502, as depicted by a dashed line circle, indicates the user is gazing at the graphical element 2502. In response, an adjusted augmented reality image 2510 can be displayed in which the graphical element 2502 is enlarged, for instance.

FIG. 26 depicts an example of a display of auxiliary information in accordance with step 1406 of FIG. 14. The augmented reality image 2600 includes text 2604 such as a word ("GDP") which the user gazes at, based on a gaze location 2602. In response, an adjusted augmented reality image 2610 can be displayed in which auxiliary information 2612 relating to the gazed-upon text is displayed. For example, the auxiliary information can be the definition of a word or phrase. If the gazed-upon text is the name of a particular person or place, the auxiliary information can provide additional information about the person or place. The auxiliary information can be provided visually, in the augmented reality image, and/or audibly, via the earphones 130 of the HMD device. In this example, the gazed-upon text of "GDP" results in the auxiliary information of: "Gross Domestic Product; def.: value of all goods and services produced." The HMD device can obtain the auxiliary information locally and/or by communicating with another device such as the hub to obtain the auxiliary information. For example, the hub can have the ability to access the auxiliary information on the Internet and communicate it to the HMD device.

FIG. 27A depicts an example message 2704 in an augmented reality image 2700 based on whether a gaze pattern is consistent with a template in accordance with step 1410 of FIG. 14. A gaze pattern for a particular reading passage 2702 can represent a series of gaze locations/eye movements, such as shown in FIG. 18, and times of the gaze locations, including time spent at each gaze location (start and stop times of each gaze location), and time spent in a transition between gaze locations. Total reading time can also be determined based on an elapsed time between first and last gaze locations of the reading passage. One or more templates can include predetermined gaze patterns, and can optionally be associated with particular reading passages. A gaze pattern can be used, e.g., to determine a reading comprehension level or ability of a person, to determine whether a particular user's gaze patterns are within an expected range, and to detect normal and abnormal gaze patterns. The focal distance of the user's eyes while reading the passage could also be considered in the template. A focal distance which is inconsistent with that of the text can be an indication that the user is gazing off into space and not comprehending the text. The HMD device can thus use a gaze estimation algorithm which determines if words are stared at, or if they are read and understood.

In one approach, a difficulty level can be assigned to a reading passage based on the complexity of the subject matter. For example, assume a reading passage is at an eighth grade level based on factors such as the complexity of the words and the sentence structure and length. A reading score can be calculated based on a number of gaze locations, or fixations, and the duration of the fixations, for a group of students. See K. Rayner, "Eye Movements as Reflections of Comprehension Processes in Reading," Scientific Studies of Reading, v10, n3 p241-255, 2006, incorporated herein by reference. For a student using the HMD device whose score is unusually high (within a top percentile), the HMD device can display a message congratulating the student. A reading score can also be based on a reading rate in words per minute. Also, a more difficult passage may be subsequently displayed as part of a reading exercise. For a student using the HMD device whose score is unusually low (within a bottom percentile), the HMD device can optionally display a message encouraging the student to re-read the passage such as a sentence (message 2704). Also, a less difficult passage may be subsequently displayed as part of a reading exercise. A message can be displayed at another location as well, such as at a user interface which is monitored by an instructor, doctor or other person. The results could be stored or transmitted as well. A feedback message need not be displayed to the user.

A person who deviates substantially, beyond a threshold level of deviation, from a template which represents a normal range of a gaze pattern and/or focal distance can thereby be identified by the HMD device. For example, a reading disability such as dyslexia may be indicated.

A different template can be provided for different gaze patterns. Example templates are provide in FIGS. 27B-27D. The HMD device, or another associated computing device, which process gaze pattern data from the HMD device, can compare each of the templates to the eye gaze data of the user to determine a closest match template. The closest match can be based on any type of algorithm such as a distance algorithm which determines a distance between the gaze pattern and each template, and selects the template having the shortest distance as the best match. The distance can be based on one or more characteristics of the gaze pattern, such as fixations, saccades, regressions, reading rate, and so forth. The result can be reported to the user and/or another person.

A determination of comprehension can also be based on whether the user is looking at the text, so that a focal distance of the user's eyes is consistent with the focal distance of the text, versus staring through the text, so that the focal distance of the user's eyes is inconsistent with, and greater than, the focal distance of the text, e.g., by a specified threshold. For instance, assume fd1 is the focal distance of the text and fd2 is the measured focal distance of the user's eyes. Then, if fd2 is between say 0.8fd1 and 1.2fd1, fd2 might be considered to be consistent with fd1. If fd2 is greater than say 1.2fd1 or 2fd1, fd2 might be considered to be inconsistent with fd1. This might also be considered an indication that the user is looking past or through the text and not comprehending it.

Figure 27B:
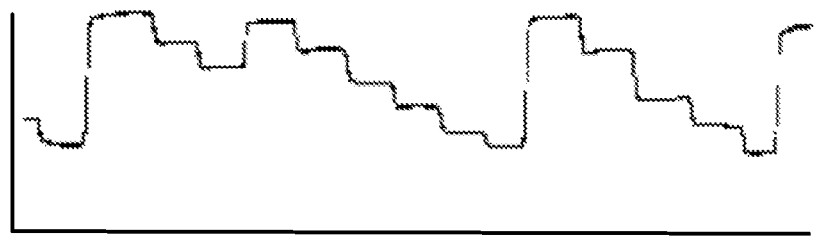
FIG. 27B depicts an example template of eye movement for a normal adult reader.
Figure 27C:
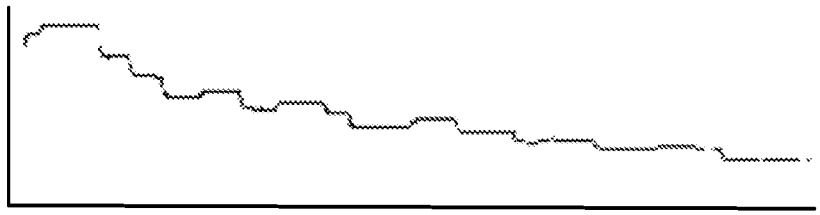
FIG. 27C depicts an example template of eye movement for a slow adult reader.
Figure 27D:
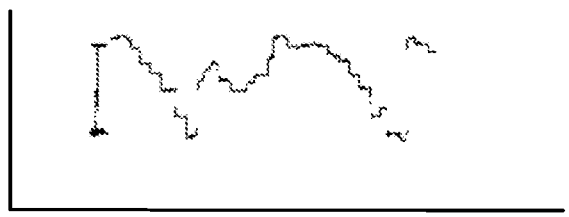
FIG. 27D depicts an example template of eye movement for a dyslexic reader.

FIG. 27B depicts an example template of eye movement for a normal adult reader. FIGS. 27B-27D are from K. Ciuffreda et al., "Eye Movements during Reading: Case Reports," Am. J. Optom. Physiol. Opt., August 1976, 53(8):389-95, incorporated herein by reference. In FIGS. 27B-27D, the horizontal direction to the right indicates increasing time. The vertical direction indicates eye movement, such that upward indicates a leftward eye movement and downward indicates a rightward eye movement. Thus, a horizontal line indicates a duration of a fixation, where there is no leftward or rightward eye movement. The horizontal and vertical scales in the different figures are not necessarily the same.

A normal eye movement pattern is characterized by a uniform decreasing staircase waveform. There is a sequence of saccades that moved the eyes rightward (1-4 degree amplitude, 24-35 msec. duration), fixation pauses (~175-325 msec.), and large return-sweep saccades to the beginning of the next line (~11 degree amplitude, 38-43 msec. duration) are present. The reading rate is about 350 words per minute. A test sample of 40 patients found normal adult values to be 50-85 fixations per 100 words, 5-15 regressions per 100 words, fixational durations of 150-375 msec., and a reading rate of 225-400 words per minute.

FIG. 27C depicts an example template of eye movement for a slow adult reader. Saccadic, pursuit, and fixational movements were within normal limits. However, several abnormalities were noted in the reading record. After reading the first half of a line of text well, the patient exhibited an abnormal eye movement pattern for the remainder of the line. In this abnormal pattern, numerous small amplitude saccades (<1 degree), regressive movements, and extended fixation pauses (400-600 msec.) were present. An analysis indicated an average of 140 fixations per 100 words, 40 regressions per 100 words, and a reading rate of approximately 150 words per minute.

FIG. 27D depicts an example template of eye movement for a dyslexic reader. The dyslexic reader exhibits a reverse-staircase phenomenon. There is a normal reading pattern in the form of a fairly uniform decreasing staircase waveform for the first to 2 sec. of the record followed by a double reverse-staircase movement during the next 2 sec. For the balance of the record, the patient has reverted to a more normal staircase pattern.

Other templates can be are associated with other reading conditions such as congenital jerk nystagmus.

FIG. 28 depicts an example message 2804 in an augmented reality image 2800 when a bookmark is made in accordance with step 1412 of FIG. 14. As mentioned previously, e.g., in connection with FIG. 19, HMD device can stop displaying the text 2802 of the augmented reality image when the user's eyes moves away from the augmented reality image, e.g., as determined by an abrupt change in focal distance and/or head orientation. The state of the augmented reality image when it is stopped can be bookmarked. When the user focuses again on the augmented reality image, or where the augmented reality image was last displayed when it was bookmarked, the text can reappear starting from the bookmarked state. A message 2804 can be displayed indicating that the bookmark is active.

Figure 29A:
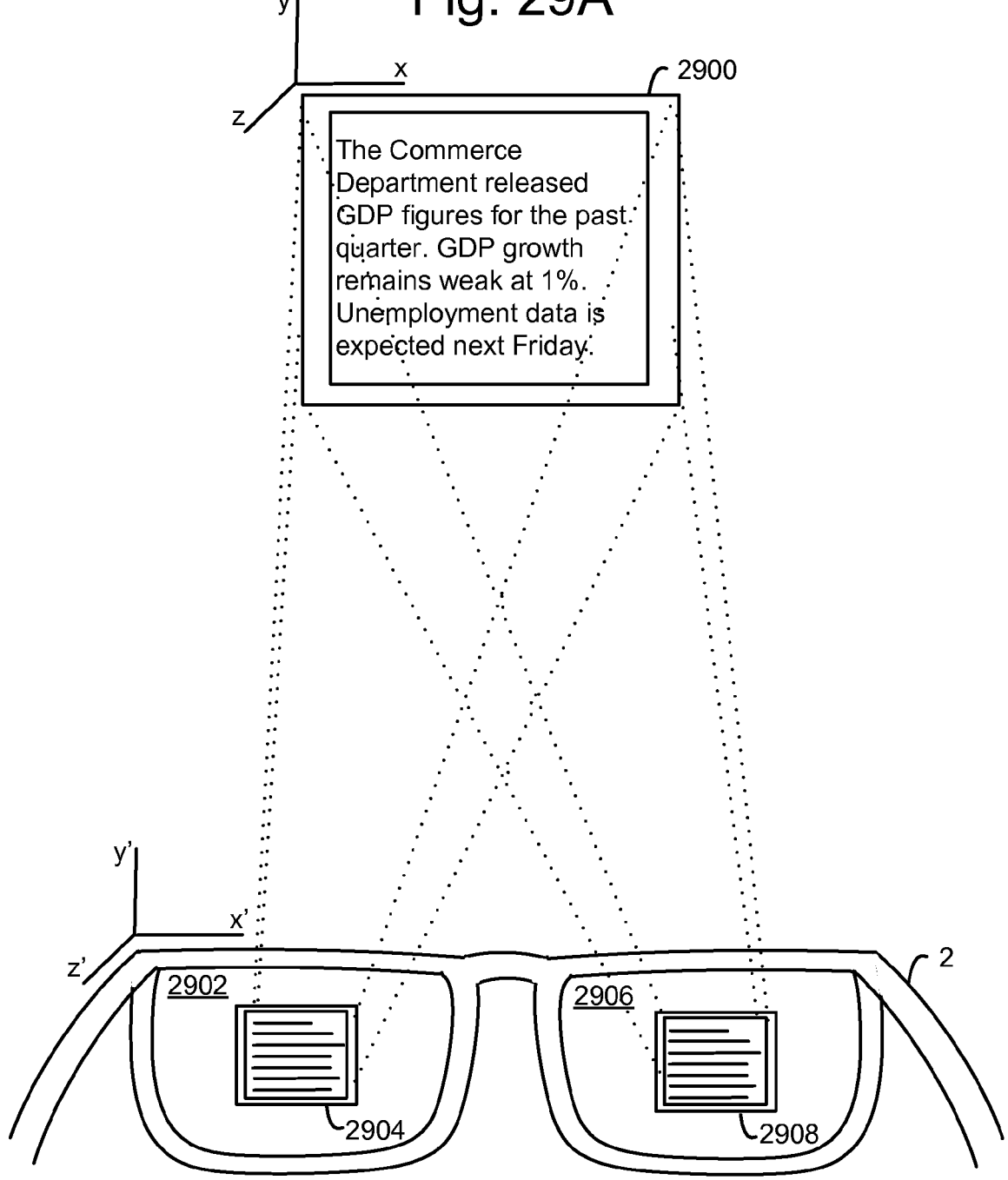
FIGS. 29A and 29B depict examples in which the orientation of the head of a user changes while the orientation of an auxiliary reality image is adjusted to be registered to a fixed real world environment, in accordance with step 1416 of FIG. 14.
Figure 29B:
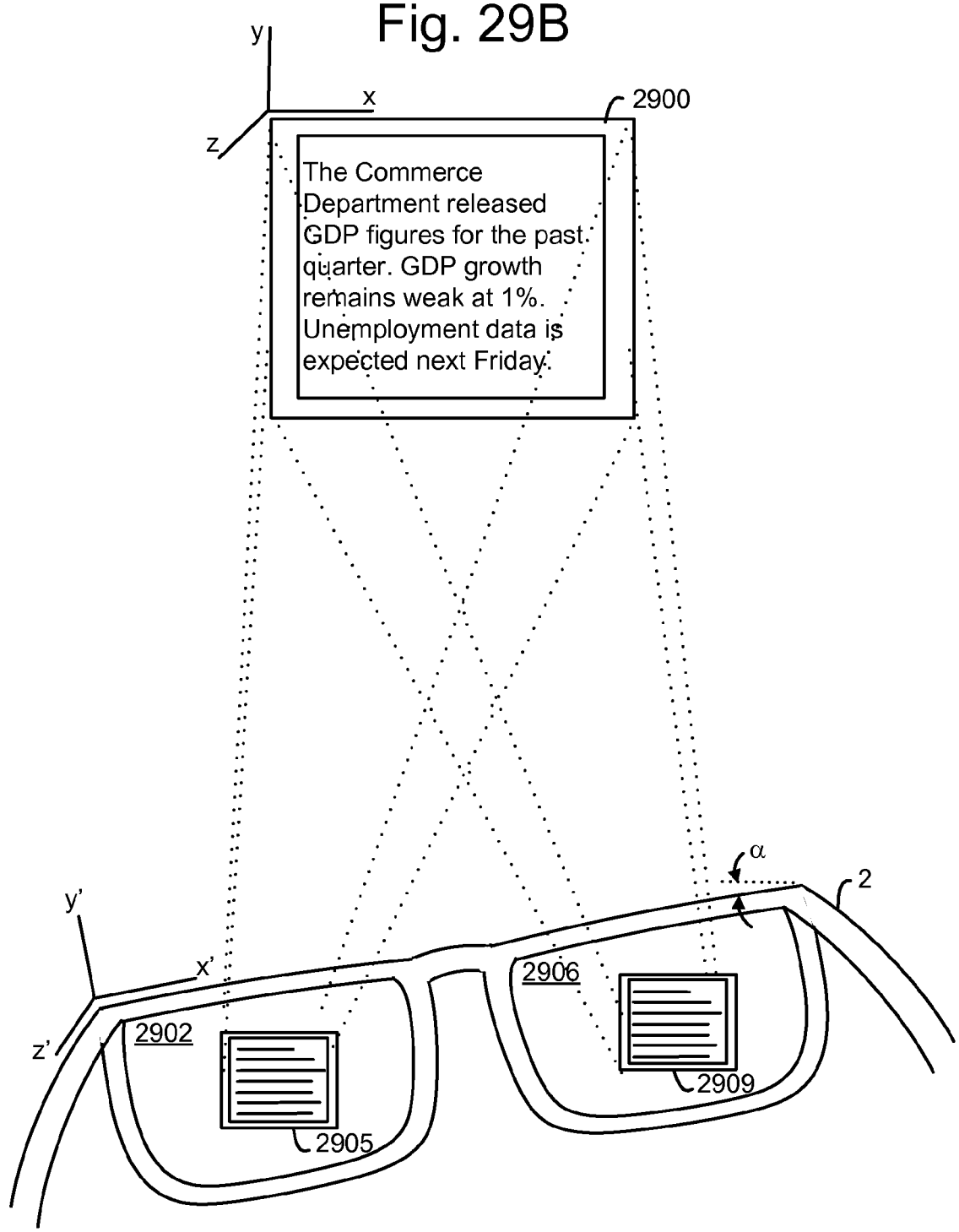

FIGS. 29A and 29B depict examples in which the orientation of the head of a user changes while the orientation of an auxiliary reality image is adjusted to be registered to a fixed real world environment, in accordance with step 1416 of FIG. 14. In FIG. 29A, an augmented reality image 2900 has a position and orientation with respect to a fixed x,y,z coordinate system, which is independent of an x',y',z' coordinate system of the HMD device 2. A region 2904 diagrammatically indicates a portion of the lens 2902 which provides the augmented reality image 2900. Similarly, a region 2908 diagrammatically indicates a portion of the lens 2906 which provides the augmented reality image 2900. In this scenario, the x,y,z coordinate system is not rotated relative to the x',y',z' coordinate system, but is translated away from the x',y',z' coordinate system.

In FIG. 29B the augmented reality image 2900 has the same position and orientation with respect to the fixed x,y,z coordinate system as in FIG. 29A, even though the x',y',z' coordinate system is rotated relative to the x,y,z coordinate system due to movement of the HMD device 2, due to movement of the user's head. This movement can be detected as a change in an orientation of the user's head using sensors on the HMD, as discussed. To ensure that the augmented reality image is rendered in substantially the same real world location, e.g., registered to the real world environment, the pixels of the HMD device which provide the augmented reality image are modified. For example, a region 2905 diagrammatically indicates a portion of the lens 2902 which provides the augmented reality image 2900, and a region 2909 diagrammatically indicates a portion of the lens 2906 which provides the augmented reality image 2900.

Figure 30A:
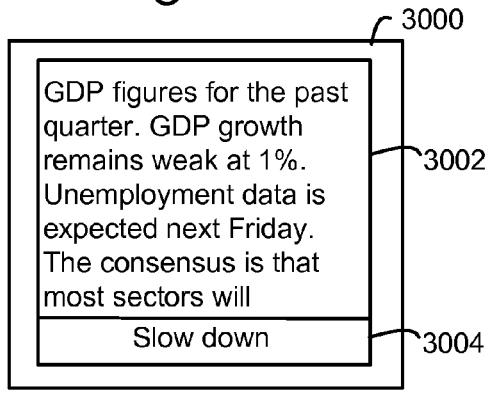
FIG. 30A depicts an example of a message to a user to adjust a reading rate based on a biological metric of the user, in accordance with step 1418 of FIG. 14.

FIG. 30A depicts an example of a message to a user to adjust a reading rate based on a biological metric of the user, in accordance with step 1418 of FIG. 14. As mentioned previously, when a detected reading rate of text 3002 by the user is higher than a desired rate, or a biological metric of the user indicates that he or she is in an excited state and may be susceptible to reading too quickly, the augmented reality image 3000 can display a message to suggest that the user slows down. This is useful, e.g., for performances such as lectures where the user is vocalizing. Many public speakers become nervous and speak too quickly.

Figure 30B:
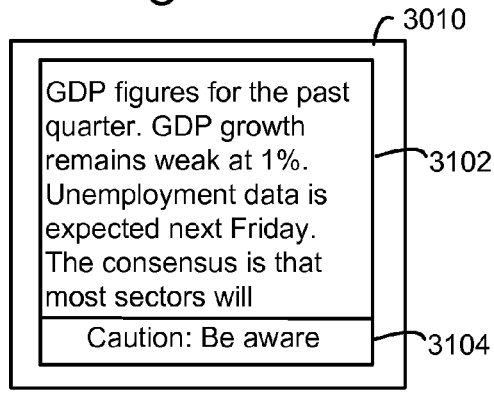
FIG. 30B depicts an example of a system message to a user, in accordance with step 1422 of FIG. 14.

FIG. 30B depicts an example of a system message to a user, in accordance with step 1422 of FIG. 14. Various system messages can be provided to the user at different times. These can includes status message, information about software updates, safety warnings and so forth. For example, if the HMD device determines that the user is walking or is otherwise in motion while reading text 3102 of the augmented reality image, a safety warning 3104 (Caution: Be aware) can inform the user to be aware of his surroundings in the real world, so that the user does not become too engrossed in the augmented reality image and walk into another person or object, for instance. Moreover, the user's gaze comprehension of the system message can be determined, e.g., based on the gaze direction and focal distance of the user's eyes. That is, it can be determined if the user looked at the system message, and whether the look was sufficient for the user to comprehend the message. If the determined level of comprehension is too low (lower than a threshold level), the system message might be repeated again relatively soon, and/or with relatively more prominence (e.g., size, appearance) than if the comprehension is sufficiently high (above a threshold). Or, a next planned system message if the comprehension level of a prior message is sufficiently high.

Figure 30C:
FIG. 30C depicts an example of adjusting the appearance of text of an augmented reality image based on the color and/or pattern of a real world object, in accordance with step 1504 of FIG. 15.

FIG. 30C depicts an example of adjusting the appearance of text of an augmented reality image based on the color and/or pattern of a real world object, in accordance with step 1504 of FIG. 15. The forward-facing camera of the HMD device can determine a visual characteristic of the environment in which the augmented reality image is displayed. For example, in the scenario of FIG. 17A, the camera and the user face a wall 1702 in the field of view of the camera. The camera can determine, e.g., color, pattern, brightness and/or reflectivity of the wall 1702. The HMD device, in response, can adjust the appearance of the text in the augmented reality image, e.g., to achieve better visibility of the text. For example, the size, color, or font of the text can be adjusted. A light intensity of the augmented reality image could also be adjusted. In the augmented reality image 3020, the wall 1702 is a dark color (e.g., black) and is seen as a background of the text, which is set to be a light color (e.g., white) to provide contrast. On the other hand, the text could be set to be a dark color if the wall color was light. Further, if the wall had a busy pattern, such as due to a patterned wall paper, the presence of books on a bookshelf, or hanging pictures, it might be helpful for the text to be made larger, or perhaps a blockier or wider font could be used to improve visibility of the text. The brightness of the text could also be adjusted in proportion to the brightness of the wall, e.g., so that the text is relatively bright when the wall is also relatively bright.

Figure 30D:
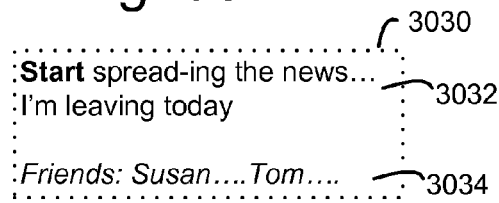
FIG. 30D depicts an example of displaying a message indicating a name and/or affiliation of another user based on a signal received from a wireless terminal of the another user, in accordance with step 1602 of FIG. 16.

FIG. 30D depicts an example of displaying a message indicating a name and/or affiliation of another user based on a signal received from a wireless terminal of the another user, in accordance with step 1602 of FIG. 16. In the augmented reality image 3030, the text 3032 is text of a karaoke application in which two lines are displayed at a time, and portions of the text which should be sung by the user in time with the music are highlighted (e.g., bolded). Based on identifiers received from mobile terminals of other users in the audience, the names of users who are on a predetermined list of friend can be displayed, e.g., Susan and Tom, in a message 3034. The subject user is made aware of the presence of these friends who might otherwise not be apparent, for example, in a dark nightclub in which the user is performing. Based on the message 3034, the user can acknowledge the presence of the friends while singing, for amusement, for instance.

Figure 30E:
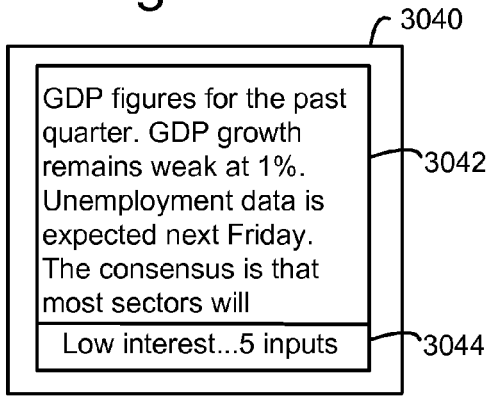
FIG. 30E depicts an example of displaying a message indicating a level of interest of another user based on a signal received from a wireless terminal of the another user, in accordance with step 1604 of FIG. 16.

FIG. 30E depicts an example of displaying a message indicating a level of interest of another user based on a signal received from a wireless terminal of the another user, in accordance with step 1604 of FIG. 16. In the augmented reality image 3040, the text 3042 is text of a teleprompter application in which multiple lines are displayed at a time, such as for a lecture. Based on level of interest data received from mobile terminals of other users in the audience, a message 3044 providing an overall level of interest in the lecture can be displayed, e.g., "Low interest", along with a number of mobile terminals which have provided inputs, e.g., "5 inputs." The overall level of interest can be determined by the HMD device based on an average or median level of interest among inputs received from multiple mobile terminals. The subject user is made aware of the level of interest of the audience and, if warranted, adjust the pace or subject matter of the presentation, call for a recess and so forth.

Figure 30F:
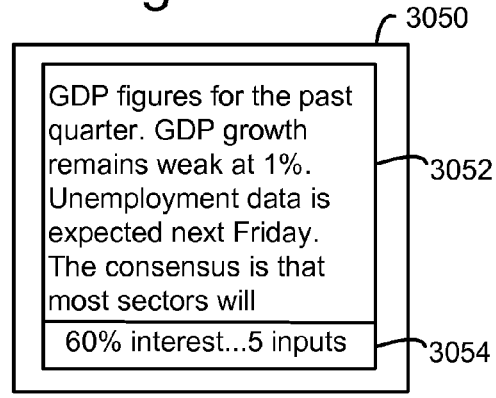
FIG. 30F depicts an alternative to the example of FIG. 30E.

FIG. 30F depicts an alternative to the example of FIG. 30E. Based on level of interest data received from mobile terminals of other users in the audience, a message 3054 providing an overall level of interest in the lecture can be displayed, as expressed by a percentage, e.g., 60%, indicating that 60% of the respondents are interested in the presentation. The augmented reality image 3050 also displays the text 3052.

Note that in some of the above examples, the text 3002, 3102, 3042 and 3044 and 3052 are displayed above, and proximate to, the text 3004, 3104, 3044 and 3054, respectively. However, the different text portions could be provided in different configurations such as in separate augmented reality images which are not proximate, to the side of the text, and so forth. The HMD device could also provide messages in the form of icons or flashing lights, for instance. Further, the HMD device could also provide messages audible to the user.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A head-mounted display device, comprising:
a microdisplay, the microdisplay projects augmented reality images comprising advancing text to an eye of a user;
a sensor, the sensor tracks a biological metric of the user while the user performs a vocal presentation of the advancing text; and
a control circuit, the control circuit is configured to control the augmented reality images responsive to the biological metric.

2. The head-mounted display device of claim 1, wherein:
the control circuit, to control the augmented reality images responsive to the biological metric, is configured to advance the text at an advance rate which is based on the biological metric.

3. The head-mounted display device of claim 2, wherein:
the advance rate is increased when the biological metric indicates the user is in a depressed state based on the biological metric being below a threshold and decreased when the biological metric indicates the user is in an excited state based on the biological metric being above the threshold.

4. The head-mounted display device of claim 1, wherein:
the control circuit, to control the augmented reality images responsive to the biological metric, is configured to provide a message which informs the user to speak slower when the biological metric indicates the user is in an excited state based on the biological metric being above a threshold, and informs the user to speak faster when the biological metric indicates the user is in a depressed state based on the biological metric being below the threshold.

5. The head-mounted display device of claim 1, wherein:
the biological metric comprises a heart rate of the user.

6. The head-mounted display device of claim 1, wherein:
the biological metric comprises a speech rate of the user.

7. The head-mounted display device of claim 1, wherein:
the biological metric comprises a pitch of the user.

8. The head-mounted display device of claim 1, wherein:
the biological metric comprises an amount of pupil dilation of the eye.

9. The head-mounted display device of claim 1, wherein:
the biological metric comprises a body temperature of the user.

10. The head-mounted display device of claim 1, wherein:
the biological metric comprises a blood glucose level of the user.

11. A processor-implemented method for providing augmented reality images in a head-mounted display device, the processor-implemented method comprising:
controlling a microdisplay associated with the head-mounted display device to emit light to an eye of a user, the light represents augmented reality images comprising advancing text;
during the controlling, and while a user performs a vocal presentation of the advancing text, receiving a wireless signal at the head-mounted display device from a wireless terminal of another person; and
controlling the augmented reality images, responsive to the wireless signal, to display a message to the eye of the user during the vocal presentation.

12. The processor-implemented method of claim 11, wherein:
the message indicates a level of interest of the another person in the vocal presentation.

13. The processor-implemented method of claim 12, wherein:
the level of interest is entered manually by the another person using the wireless terminal.

14. The processor-implemented method of claim 12, wherein:
the level of interest is determined based on a biological metric of the another person.

15. The processor-implemented method of claim 11, wherein the wireless signal comprises an identifier of the another person, the processor-implemented method further comprising:
determining a name associated with the identifier, the message identifies the name to allow the user to acknowledge a presence of the another person during the vocal presentation.

16. The processor-implemented method of claim 11, wherein the wireless signal comprises an identifier of the another person, the processor-implemented method further comprising:
determining an affiliation associated with the identifier, the message identifies the affiliation to allow the user to acknowledge the affiliation during the vocal presentation.

17. A processor-implemented method for providing augmented reality images in a head-mounted display device, the processor-implemented method comprising:
projecting augmented reality images comprising text to an eye of a user;
tracking a gaze direction of the user;
in response to the tracking, advancing the text based on the gaze direction of the user; and
using a processor:
determining a reading speed of the user based on changes in the gaze direction of the user over time, the changes comprise saccades in which the gaze direction of the user moves along a line of the text and a return sweep saccade in which gaze direction moves to a beginning of a next line of the text; and advancing the text based on the reading speed of the user.

18. The processor-implemented method of claim 17, further comprising:

determining a gaze pattern of the user based on changes in the gaze direction of the user over time; and determining a template from among a plurality of templates which is a closest match to the gaze pattern, at least one template of the plurality of templates is associated with a reading disability.

19. The processor-implemented method of claim 17, wherein:

the determining of the reading speed of the user is based on a transition between gaze locations and a number of words encompassed by the transition.

20. The processor-implemented method of claim 17, further comprising:

determining a comprehension level of the user in reading the text based on the gaze direction.

\* \* \* \* \*